(12) United States Patent
Takamatsu et al.

(10) Patent No.: US 7,975,588 B2
(45) Date of Patent: Jul. 12, 2011

(54) SCRIBING METHOD, A CUTTER WHEEL, A SCRIBING APPARATUS USING THE CUTTER WHEEL, AND AN APPARATUS FOR PRODUCING THE CUTTER WHEEL

(75) Inventors: Kiyoshi Takamatsu, Osaka (JP);
Kazuya Maekawa, Osaka (JP);
Noriyuki Ogasawara, Osaka (JP)

(73) Assignee: Mitsuboshi Diamond Industrial Co., Ltd., Osaka (JP)

( * ) Notice: Subject to any disclaimer, the term of this patent is extended or adjusted under 35 U.S.C. 154(b) by 0 days.

(21) Appl. No.: 12/405,352

(22) Filed: Mar. 17, 2009

(65) Prior Publication Data

US 2009/0179060 A1    Jul. 16, 2009

Related U.S. Application Data

(63) Continuation of application No. 10/468,754, filed on Apr. 7, 2004, now Pat. No. 7,523,846.

(30) Foreign Application Priority Data

Mar. 16, 2001   (JP) .................................. 2001-076082

(51) Int. Cl.
*B26D 3/08*    (2006.01)
*B26F 3/00*    (2006.01)
(52) U.S. Cl. ............................... 83/880; 83/866; 83/663
(58) Field of Classification Search ............... 83/332, 83/678, 671, 866, 676, 880, 663, 13, 879, 83/886; 30/319, 347, 357, 365, 355, 164, 30/95; 76/115; 125/1–5, 103, 93, 94, 96.5, 125/96.96, 884, 886, 887; 428/462, 465
See application file for complete search history.

(56) References Cited

U.S. PATENT DOCUMENTS

| 149,748 A | 4/1874 | Hale |
| 156,748 A | 11/1874 | Andrews |
| 352,867 A | 11/1886 | Greist |
| 1,334,633 A | 3/1920 | Pioche |
| 2,850,056 A | 9/1958 | Kehl |

(Continued)

FOREIGN PATENT DOCUMENTS

EP    0 773 194    5/1997

(Continued)

OTHER PUBLICATIONS

Copending U.S. Appl. No. 10/468,754, filed Aug. 22, 2003 (specification submitted herewith).

(Continued)

*Primary Examiner* — Ghassem Alie
(74) *Attorney, Agent, or Firm* — Renner, Otto, Boisselle & Sklar, LLP

(57) ABSTRACT

In a glass cutter wheel where a blade edge is formed on a disk-shaped wheel, grooves having a predetermined shape are formed at a predetermined pitch in a 1/4 or smaller or 3/4 or smaller blade edge line portion of the entire perimeter of the blade edge. The ratio of the groove portion to the entire perimeter, which largely contributes to a scribing characteristic, is changed such that a desired scribing characteristic can be obtained.

3 Claims, 15 Drawing Sheets

U.S. PATENT DOCUMENTS

| | | | |
|---|---|---|---|
| 3,176,397 A | | 4/1965 | Schuhmann |
| 3,203,140 A | * | 8/1965 | Hallez ............................. 451/541 |
| 3,831,484 A | * | 8/1974 | Gibb ................................ 83/847 |
| 3,869,795 A | | 3/1975 | Treace |
| 3,978,752 A | | 9/1976 | Meaden et al. |
| 4,382,397 A | | 5/1983 | De Torre |
| 4,891,885 A | | 1/1990 | Fischer et al. |
| 5,144,749 A | | 9/1992 | Chen |
| 5,697,835 A | | 12/1997 | Nitz et al. |
| 5,836,229 A | | 11/1998 | Wakayama et al. |
| 2002/0038594 A1 | | 4/2002 | Maekawa et al. |
| 2003/0159297 A1 | | 8/2003 | Chae |
| 2006/0042433 A1 | * | 3/2006 | Maekawa et al. ................. 83/13 |

FOREIGN PATENT DOCUMENTS

| | | |
|---|---|---|
| JP | 06-048755 | 2/1994 |
| JP | 06-056451 | 3/1994 |
| JP | 11-116260 | 4/1999 |
| JP | 2000-219527 | 8/2000 |

OTHER PUBLICATIONS

Copending U.S. Appl. No. 12/355,110, filed Jan. 16, 2009 (specification submitted herewith).

European Search Report for corresponding European Application No. 02 705 277.8 dated Dec. 1, 2010.

* cited by examiner

FIG.1 CONVENTIONAL ART
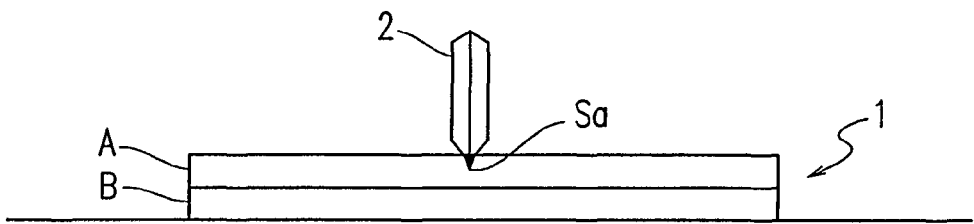
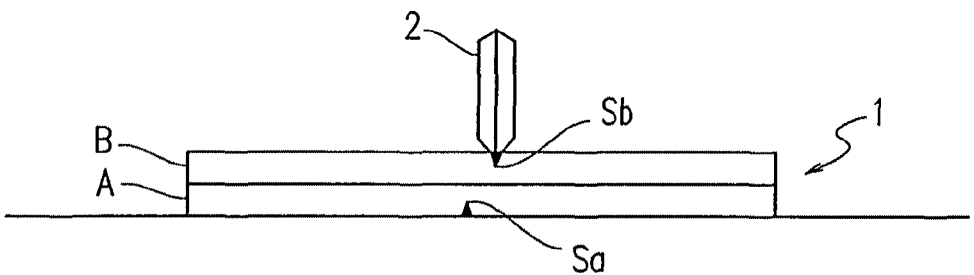
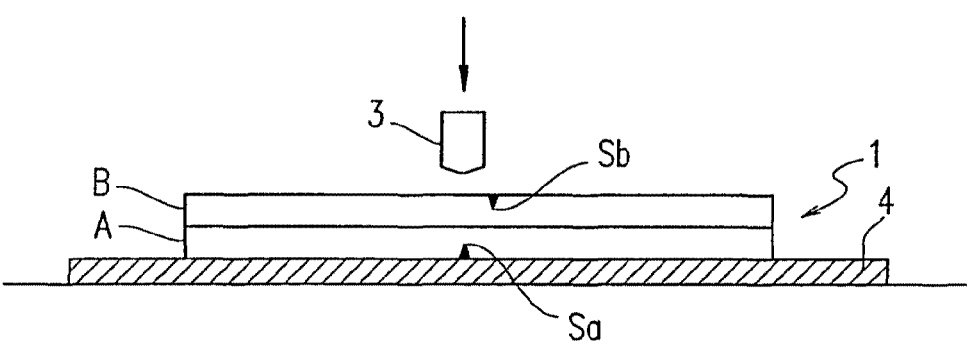
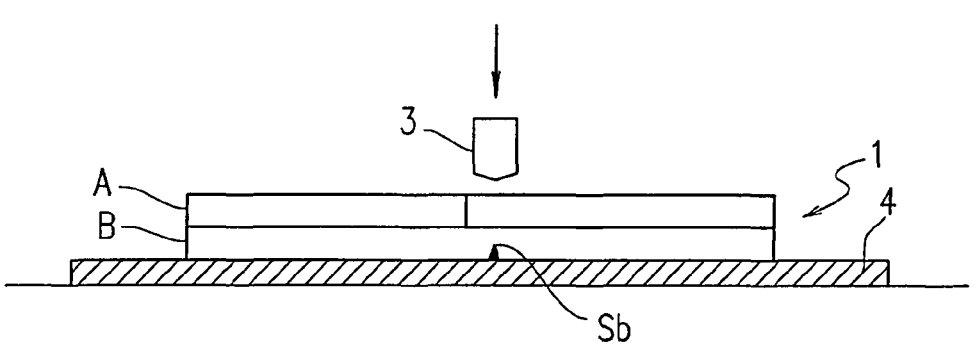

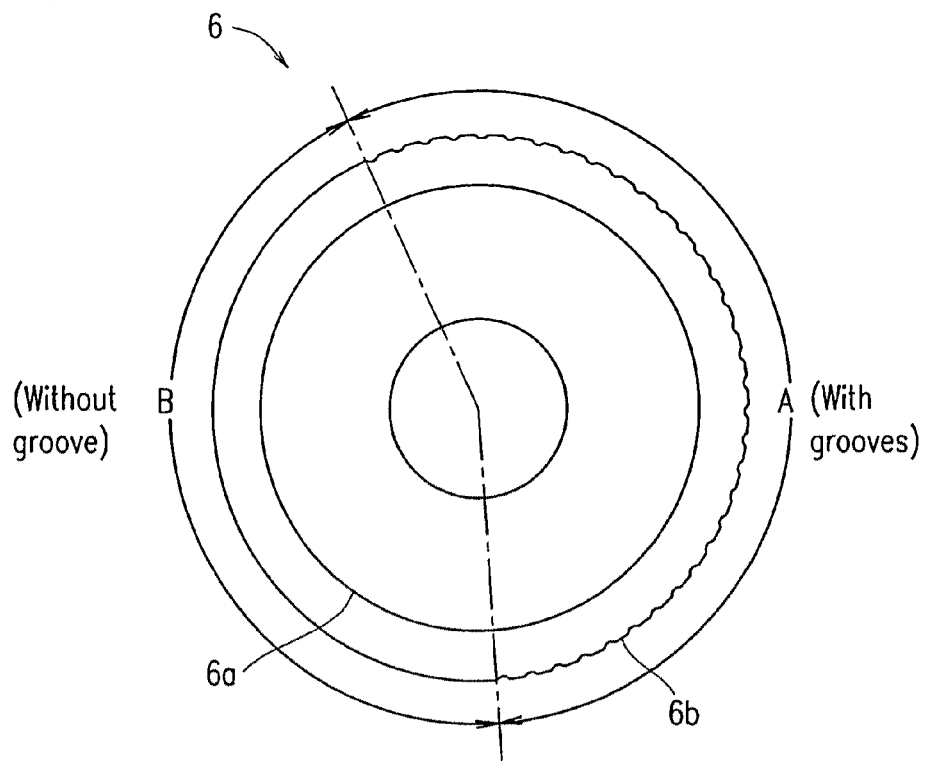
FIG.5
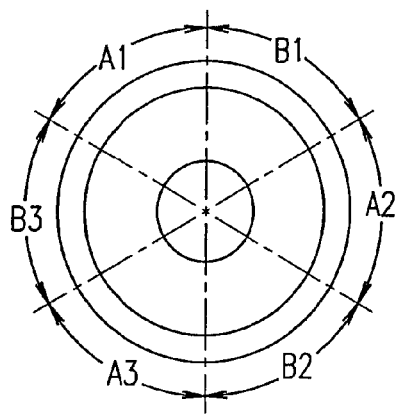 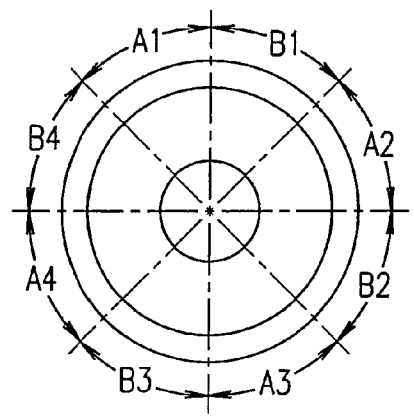
FIG.6

FIG. 9
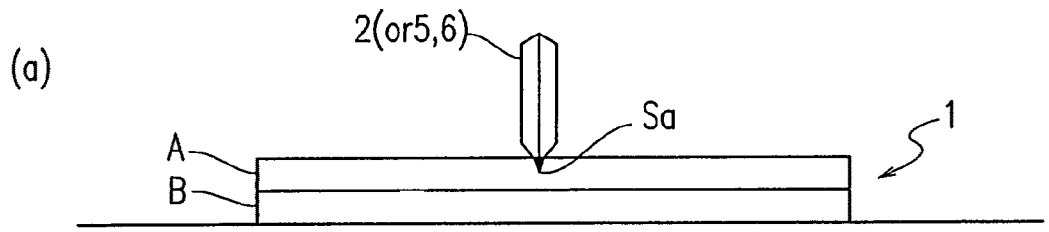
(a) First scribing apparatus
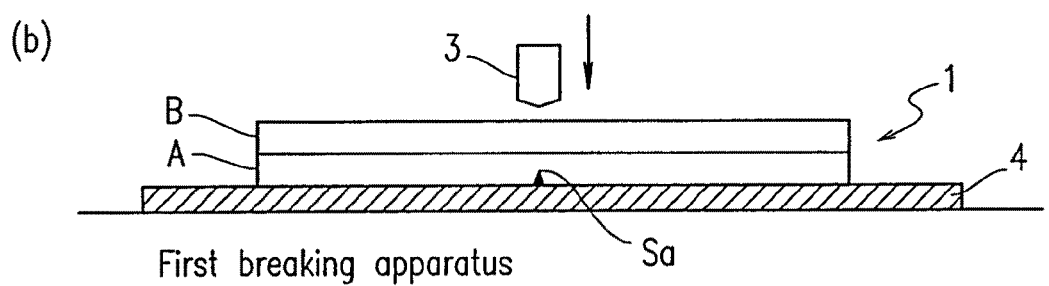
(b) First breaking apparatus
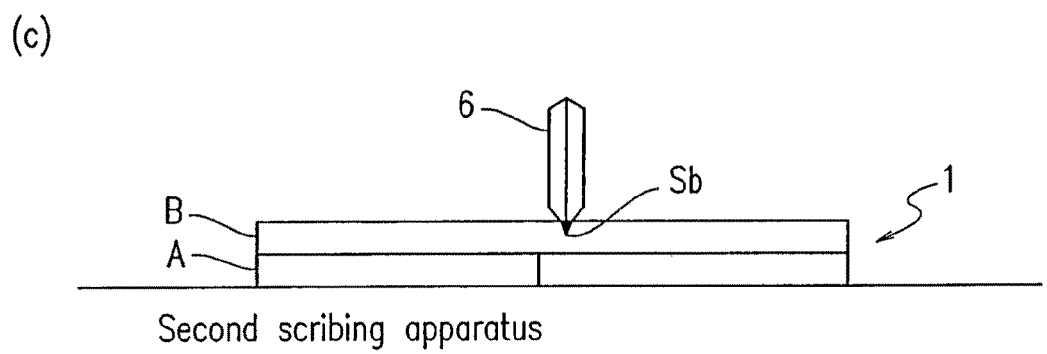
(c) Second scribing apparatus
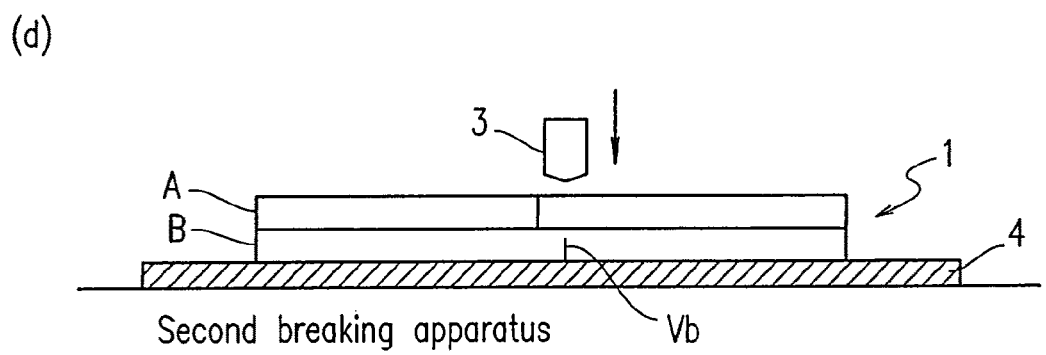
(d) Second breaking apparatus FIG.18 (Processing operation)

SCRIBING METHOD, A CUTTER WHEEL, A SCRIBING APPARATUS USING THE CUTTER WHEEL, AND AN APPARATUS FOR PRODUCING THE CUTTER WHEEL

RELATED APPLICATION DATA

This application is a continuation of U.S. patent application Ser. No. 10/468,754 filed on Apr. 7, 2004, now U.S. Pat. No. 7,523,846 which is hereby incorporated by reference, and this application is related as having a common parent application to U.S. patent application Ser. No. 12/355,110, filed on Jan. 16, 2009, a divisional of U.S. patent application Ser. No. 10/468,754

TECHNICAL FIELD

The present invention relates to: a scribing method of forming a scribe line for separating a brittle material; a cutter wheel, which is a scribe cutter used for forming a scribe line in a brittle material; a scribing apparatus incorporating such a cutter wheel; and a cutter wheel production apparatus for producing such a cutter wheel.

The brittle material includes glass, used for a glass substrate or a bonded glass substrate, a semiconductor wafer, ceramics, etc.

BACKGROUND ART

FIGS. 1(a) through 1(d) are cross-sectional views for illustrating a first separation method of a liquid crystal mother substrate in a step-by-step manner as an example of a conventional procedure for cutting a bonded glass substrate, such as a liquid crystal mother substrate, at a desired cutting position. In the following descriptions, in a bonded glass substrate formed by a pair of glass substrates, which is a liquid crystal mother substrate, one of the glass substrates is referred to as an A-side glass substrate, and the other glass substrate is referred to as a B-side glass substrate, for convenience of explanation.

(1) First, as shown in FIG. 1(a), the bonded glass substrate 1 is placed on a first scribing apparatus such that the A-side glass substrate is laid over the B-side glass substrate, and the A-side glass substrate is scribed using a glass cutter wheel 2 so as to form a scribe line Sa.

(2) Next, the bonded glass substrate 1 in which the scribe line Sa was formed in the A-side glass substrate is turned over, and transported to a second scribing apparatus. In this second scribing apparatus, the B-side glass substrate of the bonded glass substrate 1 is scribed using a glass cutter wheel 2 so as to form a scribe line Sb which is parallel to the scribe line Sa as shown in FIG. 1(b). It should be herein noted that, in the case of a liquid crystal mother substrate, a plurality of liquid crystal panels are formed from the liquid crystal mother substrate, and in each liquid crystal panel, it is necessary to form terminals at a side edge portion in one glass substrate. Thus, in many cases, the scribing position of the scribe line Sa formed in the A-side glass substrate and the scribing position of the scribe line Sb formed in the B-side glass substrate are shifted from each other along a horizontal direction as shown in FIG. 1(b).

(3) Next, the bonded glass substrate 1 where the scribe lines Sa and Sb were formed in the A-side glass substrate and the B-side glass substrate, respectively, is transported to a first breaking apparatus without being turned over, i.e., without exchanging the positions of the A-side glass substrate and the B-side glass substrate. In the first breaking apparatus, as shown in FIG. 1(c), the bonded glass substrate 1 is placed on a mat 4. A break bar 3 is pushed against the B-side glass substrate of the bonded glass substrate 1 along the scribe line Sa formed in the A-side glass substrate. As a result, a crack extends upwardly from the scribe line Sa, and accordingly, the lower A-side glass substrate is broken along the scribe line Sa.

(4) Next, the bonded glass substrate 1 in which the A-side glass substrate was broken is turned over such that the A-side glass substrate is over the B-side glass substrate, and transported to a second breaking apparatus. In the second breaking apparatus, as shown in FIG. 1(d), the bonded glass substrate 1 is placed on a mat 4. A break bar 3 is pushed against the A-side glass substrate of the bonded glass substrate 1 along the scribe line Sb formed in the B-side glass substrate. As a result, the lower B-side glass substrate is broken along the scribe line Sb.

By performing above steps (1) through (4), the bonded glass substrate 1 is separated into two at desired positions.

As illustrated in above steps (3) and (4), the break bar 3 is pushed against the upper glass substrate, whereby the lower glass substrate is broken. For example, as shown in FIG. 1(c), when the break bar 3 is pushed against the upper B-side glass substrate, the A-side glass substrate and the B-side glass substrate are bent downward at a position against which the break bar 3 is pushed, whereby force is applied to the A-side glass substrate so as to horizontally widen the crack formed along the vertical direction (vertical crack) of the scribe line Sa formed in the A-side glass substrate. As a result, the vertical crack extends upwardly so as to reach the upper surface of the A-side glass substrate, whereby the A-side glass substrate is separated. On the other hand, in the scribe line Sb formed in the upper B-side glass substrate, force in a horizontal direction from both ends of the B-side glass substrate toward the crack, which is the opposite direction to that of the force caused in the lower glass substrate, is applied so as to compress the crack (vertical crack). Therefore, the B-side glass substrate is not broken.

In the breaking steps performed at steps (3) and (4), when the vertical crack of the scribe line Sa of the lower A-side glass substrate is shallow as shown in FIG. 1(c), it is necessary to apply a relatively large pushing force in order to break the A-side glass substrate. However, when the pushing force applied by the break bar 3 is too strong, the upper B-side glass substrate may be broken simultaneously with the A-side glass substrate. In this case, in the lower A-side glass substrate, the vertical crack extends along a substantially vertical direction to break the lower A-side glass substrate, i.e., no problem is caused. However, since in the upper B-side glass substrate, the position where the force is applied by the break bar 3 is different from the position of the scribe line Sb formed in the B-side glass substrate, force is not caused in a direction such that the upper B-side glass substrate is broken. Thus, a separation face may be formed in an oblique direction. Furthermore, cracks may be formed so as to be in contact with each other so that defects (horizontal cracks) are caused at that position of contact. A bonded glass substrate having such a separation face extending along an oblique direction, or such defects, has no commercial value as a liquid crystal panel.

The applicant of the present application has proposed a separation method of a brittle substrate which can solve such problems in Japanese Laid-Open Publication No. 6-48755 entitled "Separation Method of Bonded Glass Substrate".

FIGS. 2(a) through 2(d) are cross-sectional views which illustrate a second separation method for separating a brittle material, which is described in the above publication, in a step-by-step manner. Hereinafter, the method described in this publication is described with reference to FIGS. 2(a) through 2(d). In the following descriptions also, as referred to in FIGS. 1(a) through 1(d), in a bonded glass substrate formed by a pair of glass substrates, which is a liquid crystal mother substrate, one of the glass substrates is referred to as an A-side glass substrate, and the other glass substrate is referred to as a B-side glass substrate, for convenience of explanation.

(1) First, as shown in FIG. 2(a), the bonded glass substrate 1 is placed on a first scribing apparatus such that the A-side glass substrate is over the B-side glass substrate, and the A-side glass substrate is scribed using a glass cutter wheel 2 so as to form a scribe line Sa.

(2) Next, the bonded glass substrate 1 where the scribe line Sa was formed in the A-side glass substrate is turned over, and transported to a first breaking apparatus. In this first breaking apparatus, as shown in FIG. 2(b), the bonded glass substrate 1 is placed on a mat 4. A break bar 3 is pushed against the B-side glass substrate of the bonded glass substrate 1 along the scribe line Sa formed in the A-side glass substrate. As a result, in the lower A-side glass substrate, a crack extends upwardly from the scribe line Sa, and accordingly, the A-side glass substrate is broken along the scribe line Sa.

(3) Next, the bonded glass substrate 1 where the A-side glass substrate was broken is transported to a second scribing apparatus without being turned over, i.e., without exchanging the positions of the A-side glass substrate and the B-side glass substrate. In this second scribing apparatus, the B-side glass substrate of the bonded glass substrate 1 is scribed using a glass cutter wheel 2 so as to form a scribe line Sb which is parallel to the scribe line Sa as shown in FIG. 2(c). It should be herein noted that, in the case of a liquid crystal mother substrate, a plurality of liquid crystal panels are formed from the liquid crystal mother substrate, and in each liquid crystal panel, it is necessary to form terminals at a side edge portion in one glass substrate. Thus, in many cases, the scribing position of the scribe line Sa formed in the A-side glass substrate and the scribing position of the scribe line Sb formed in the B-side glass substrate are shifted from each other along a horizontal direction.

(4) Next, the bonded glass substrate 1 is turned over such that the A-side glass substrate is over the B-side glass substrate, and transported to a second breaking apparatus. In the second breaking apparatus, as shown in FIG. 2(d), the bonded glass substrate 1 is placed on a mat 4. A break bar 3 is pushed against a portion of the A-side glass substrate of the bonded glass substrate 1 which corresponds to the scribe line Sb formed in the B-side glass substrate. As a result, the lower B-side glass substrate is broken along the scribe line Sb.

By performing above steps (1) through (4), the bonded glass substrate 1 is separated into two at desired positions.

In this second separation method of a brittle material, as illustrated in steps (2) and (4), at a breaking step, the lower glass substrate to be broken has a scribe line whereas the upper glass substrate to does not have a scribe line. Thus, the upper glass substrate is not broken simultaneously with the breakage of the lower glass substrate. Therefore, occurrence of the problems which may occur in the first separation method illustrated in FIGS. 1(a) through 1(d), such as a separation face extending along an oblique direction, formation of defects, etc., can be avoided.

FIG. 3 is a side view of the glass cutter wheel 2 used in the first and second separation methods, which is seen along a direction perpendicular to the rotation axis of the glass cutter wheel 2. The glass cutter wheel 2 is formed into the shape of a disk, where φ denotes the wheel diameter and w denotes the wheel thickness, and a blade edge having a blade edge angle α is formed along the perimeter of the wheel.

The applicant of the present application further improved the glass cutter wheel 2 shown in FIG. 3 to obtain a glass cutter wheel which can form a deeper vertical crack, which is disclosed in Japanese Laid-Open Publication No. 9-188534 entitled "Glass Cutter Wheel".

FIG. 4 is a side view of a glass cutter wheel disclosed in this publication, which is seen along the rotation axis of the glass cutter wheel.

This glass cutter wheel 5 has undulations at the edge line portion of a blade edge formed at the perimeter of a wheel. That is, U-shaped or V-shaped grooves Sb are formed at the edge line portion 5a of the blade edge. These grooves 5b are formed by cutting notches at depth h from the edge line portion 5a at pitch P. By forming these grooves 5b, protrusions j having a height h are formed at pitch P.

In FIG. 4, the grooves formed at the edge line portion are shown in a large size for the purpose of readily recognizing the grooves. However, the actual size of the grooves is a size of the micron order, which is not perceptible by a human eye.

TABLE 1 below shows specific numerical values of the wheel diameter φ, the wheel thickness w, etc. The values are shown for two examples, Type 1 and Type 2.

TABLE 1

|  | Type 1 | Type 2 |
| --- | --- | --- |
| Wheel diameter φ | 2.5 mm | 2.0 mm |
| Wheel thickness w | 0.65 mm | 0.65 mm |
| Blade edge angle α | 125° | 125° |
| Number of protrusions j | 125 | 110 |
| Height h of protrusions j | 5 μm | 10 μm |
| Pitch P | 63 μm | 63 μm |
| Blade edge load | 3.6 Kgf | 1.8 Kgf |
| Scribing speed | 300 mm/sec | 400 mm/sec |

The glass cutter wheel having undulations at the edge line portion has a significantly improved scribing characteristic, i.e., a significantly improved ability to form a vertical crack. By performing a scribing process using this glass cutter wheel, a deep vertical crack which almost reaches the vicinity of the lower surface of a scribed glass plate can be obtained in the scribing process.

The glass cutter wheel 5 having undulations at the edge line portion has a significantly improved scribing characteristic as compared with a conventional glass cutter wheel. However, since precise undulations are formed along the entire perimeter of the edge line portion of the glass cutter wheel 5, the process and formation of the undulations in the edge line portion requires a long process time, and there are some problems in processability.

In the case where the second separation method illustrated in FIG. 2 is performed using the glass cutter wheel 5 having undulations at the edge line portion, a scribe line Sb of a deep vertical crack is formed in the B-side glass substrate, and in some cases, the bonded glass substrate 1 is substantially separated at the time when the upper B-side glass substrate has been scribed at Step (3). Thus, when the bonded glass substrate 1 is transported using a suction pad, or the like, to the second breaking apparatus during a transition period between Step (3) and Step (4), one piece of the separated bonded glass substrate 1 may be left in the second scribing apparatus. Furthermore, during transportation of the bonded glass substrate 1, one piece of the separated bonded glass substrate 1 may fall from the suction pad. In such a case, a production line apparatus for separating the bonded glass substrate 1 may not operate in a normal manner.

The present invention was conceived to solve the above problems. An object of the present invention is to provide: a glass cutter wheel where problems in processability, which may occur in a glass cutter wheel having undulations in the entire perimeter of the edge line portion, are solved, and a desired scribing characteristic can be obtained, i.e., a scribe line of a vertical crack having a desired depth can be formed in a glass substrate separation process; a scribing method for forming a scribe line which enables separation of a brittle material; a scribing apparatus incorporating such a cutter wheel; and a cutter wheel production apparatus for producing such a cutter wheel.

DISCLOSURE OF THE INVENTION

A scribing method of the present invention which uses a brittle material separation disk-shaped wheel having a central portion in a thickness direction protruding in a circumferential direction so as to form a blade edge at an edge line portion of the wheel, and a plurality of grooves having a predetermined shape formed in the edge line portion at a predetermined pitch, is characterized in that scribing is performed using a wheel where the ratio of a length of a region occupied by the plurality of grooves with respect to an entire perimeter of the edge line portion is smaller than 1, whereby a depth of a vertical crack formed inside a scribed brittle material is periodically varied.

In the above scribing method of the present invention, it is preferable that scribing is performed using a wheel where the ratio of a length of a region occupied by the plurality of grooves with respect to the entire perimeter of the edge line portion is equal to or smaller than 3/4.

In the above scribing method of the present invention, it is more preferable that scribing is performed using a wheel where the ratio of a length of a region occupied by the plurality of grooves with respect to the entire perimeter of the edge line portion is equal to or smaller than 1/4.

A cutter wheel of the present invention which is used for separating a brittle material, where a blade edge is formed in an edge line portion of a disk-shaped wheel, and a plurality of grooves having a predetermined shape are formed in the edge line portion at a predetermined pitch, is characterized in that the ratio of a length of a region occupied by the plurality of grooves with respect to an entire perimeter of the edge line portion is smaller than 1.

In the above cutter wheel of the present invention, it is preferable that the ratio of a length of a region occupied by the plurality of grooves with respect to the entire perimeter of the edge line portion is greater than 1/4, and equal to or smaller than 3/4.

In the above cutter wheel of the present invention, it is more preferable that the ratio of a length of a region occupied by the plurality of grooves with respect to the entire perimeter of the edge line portion is equal to or smaller than 1/4.

In the above cutter wheel of the present invention, it is preferable that the pitch at which the plurality of grooves are formed is 20-200 µm according to a wheel diameter of 1-20 mm.

In the above cutter wheel of the present invention, it is more preferable that the depth of the plurality of grooves is 2-200 µm according to a wheel diameter of 1-20 mm.

In the above cutter wheel of the present invention, it is more preferable that the cutter wheel is integrally formed with a shaft which penetrates through the wheel.

In the above cutter wheel of the present invention, it is more preferable that at least one groove region is formed in the edge line portion; and the grooves have different depths such that the depth of the groove is deeper in a central portion of the groove region than in end portions of the groove region.

Another cutter wheel of the present invention is characterized in that: groove regions are formed over the entire perimeter of the edge line portion; and a region where the depth of the grooves becomes deeper, and a region where the depth of the grooves becomes shallower, are continuously provided.

A scribing apparatus of the present invention which includes a mechanism for moving a cutter head along the X-direction and/or the Y-direction with respect to a table on which a brittle material is placed, is characterized in that the cutter head is provided with the above cutter wheel of the present invention.

A method for separating a bonded glass substrate of the present invention which includes a first scribing step, a second scribing step, and a breaking step, is characterized in that the above glass cutter wheel of the present invention is used in the second scribing step.

A method for separating a bonded glass substrate of the present invention which includes a first scribing step, a first breaking step, a second scribing step, and a second breaking step, is characterized in that the above glass cutter wheel of the present invention is used in the second scribing step.

A cutter wheel production apparatus for producing the cutter wheel of the present invention, which includes: at least one rotatably supported disk-shaped grinding member; and a grinding mechanism which supports at least one cutter wheel to be ground, and which advances and retracts the cutter wheel toward/from the grinding member, is characterized in that the grinding mechanism has rotation means for moving a portion of the cutter wheel which is to be ground by the grinding member.

The above cutter wheel production apparatus of the present invention preferably further includes: advancing/retracting means for advancing/retracting the grinding mechanism toward/from the grinding member; and control means for controlling the advancing/retracting means and the rotation means.

In the above cutter wheel production apparatus of the present invention, it is preferable that the control means controls the rotation means based on the number of divisions and the number of regions over the entire perimeter of an edge line portion of the cutter wheel, so as to form a groove at a desired position in the edge line portion.

BRIEF DESCRIPTION OF THE DRAWINGS

FIG. 1 illustrates a conventional separation procedure of a bonded glass panel.

FIG. 5 is a side view of a glass cutter wheel of an embodiment of the present invention.

FIG. 6 is a side view of a glass cutter wheel of another embodiment of the present invention.

FIG. 9 illustrates another separation procedure using a scribing apparatus which incorporates a glass cutter wheel of the present invention.

BEST MODE FOR CARRYING OUT THE INVENTION

FIG. 5 is a side view showing a glass cutter wheel 6 of embodiment 1 of the present invention.

As shown in FIG. 5, this glass cutter wheel 6 has a region A where grooves are formed in a blade edge line portion and a region B where grooves are not formed in the blade edge line portion.

The ratio of the edge line portion of the region A, where grooves are formed, with respect to the entire edge line portion (region A+region B) (hereinafter, referred to as "the ratio of the region A to the entire perimeter") is preferably 3/4 or less in view of the processability for forming grooves in the edge line of the glass cutter wheel 6. With such a ratio, a process of forming grooves does not take a long time, and good processability can be obtained.

Figure 7:
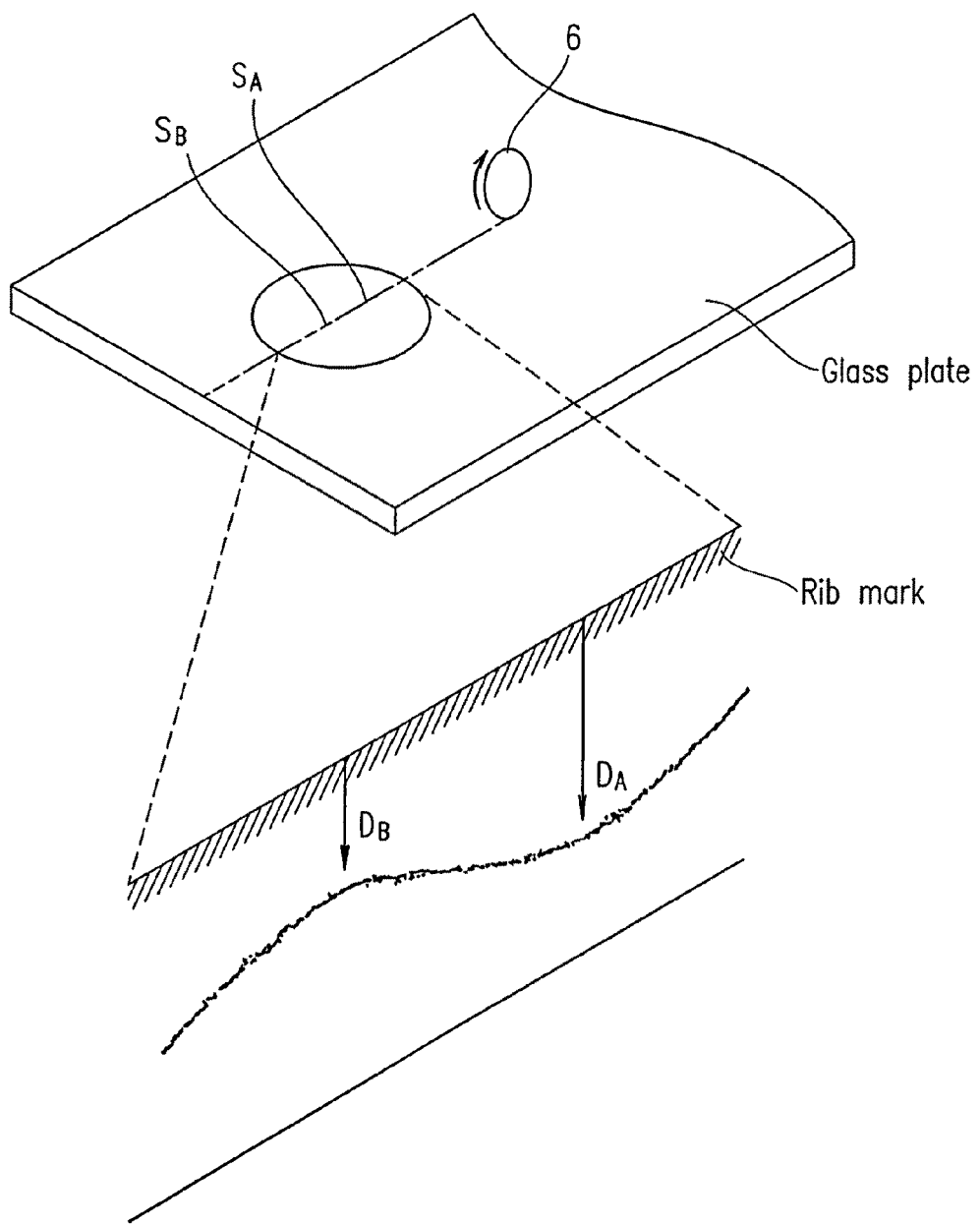
FIG. 7 shows a vertical crack formed when scribing is performed using a glass cutter wheel of the present invention.

In the case where the ratio of the region A to the entire perimeter is 3/4 or lower and higher than 1/4, a vertical crack whose depth periodically varies can be obtained as shown in FIG. 7 described later. In the case where the ratio of the region A to the entire perimeter is in such a range, it is necessary to impose limited conditions in order to obtain the above periodical crack.

Alternatively, in the case where the ratio of the region A to the entire perimeter is 1/4 or lower, a vertical crack whose depth periodically varies can be stably obtained under broader conditions. Setting the ratio of the region A to the entire perimeter to be within this range is suitable for preventing a problem which may occur during transportation of a brittle substrate where a scribe line has been formed, such as the dropping of a piece of the brittle substrate which is separated during transportation.

The grooves 6b formed in the region A of the edge line portion are intentionally formed on a periodic basis on the micron order. These grooves 6b should be considered to be different from abrasive streaks of the submicron order which are inevitably formed during a grinding process of forming a blade edge line.

FIG. 6 shows another example of a glass cutter wheel according to embodiment 1. In FIG. 6(a), the entire blade edge is divided into six regions such that the regions A and the regions B are alternately formed. In FIG. 6(b), the entire blade edge is divided into eight regions such that the regions A and the regions B are alternately formed.

In FIG. 6(b), the regions A where grooves are formed are formed in a plurality of regions A1 through A4, and the regions B where grooves are not formed are formed in a plurality of regions B1 through B4. The length of each of the regions A1 through A4 and regions B1 through B4 is, for example, set such that the following relationships are satisfied:

$A1=A2=A3=A4;$ $A1+A2+A3+A4=A;$ $B1=B2=B3=B4;$ $B1+B2+B3+B4=B;$ and $A/B=1.$

In this case, the lengths of the regions A1 through A4 are all equal, and the lengths of the regions B1 through B4 are all equal. Further, since A/B=1 is satisfied, the ratio of the region A to the entire perimeter is 2/4.

In an alternative example, the following relationships are satisfied:

$A1=A2 \neq A3 \neq A4;$ $A1+A2+A3+A4=A;$ $B1=B2 \neq B3 \neq B4;$ $B1+B2+B3+B4=B;$ and $A/B=1.$ In this case, as for the regions A1 through A4 and the regions B1 through B4, the length of the region A3 and the length of the region A4 are different from the length of the region A1 and the length of the region A2, and the length of the region B3 and the length of the region B4 are different from the length of the region B1 and the length of the region B2. Further, as for the entire perimeter, since A/B=1 is satisfied, the ratio of the region A to the entire perimeter is 2/4.

In a further alternative example, the following relationships are satisfied:

$A1=A2 \neq A3 \neq A4;$ $A1+A2+A3+A4=A;$ $B1=B2 \neq B3 \neq B4;$ $B1+B2+B3+B4=B;$ and $A/B=3/1.$ In this case, as for the regions A1 through A4 and the regions B1 through B4, the length of the region A3 and the length of the region A4 are different from the length of the region A1 and the length of the region A2, and the length of the region B3 and the length of the region B4 are different from the length of the region B1 and the length of the region B2. Further, as for the entire perimeter, since A/B=3/1 is satisfied, the ratio of the region A to the entire perimeter is 3/4.

This glass cutter wheel 6 may be formed integrally with a shaft which is inserted in the wheel 6. As a method for integrally forming the glass cutter wheel 6, a method of integrally grinding the wheel 6 and the shaft, a method of attaching a blade edge and a shaft with an adhesive and/or by welding, etc., are employed.

FIG. 7 is a schematic view generally showing a vertical crack generated in a glass substrate when a scribe line is formed in the glass substrate using the above glass cutter wheel 6.

In a scribe line formed by scribing glass using the glass cutter wheel 6, the depth of a vertical crack is different in a scribe line $S_A$, which is formed by the region A having grooves, and in a scribe line $S_B$, which is formed by the region B having no groove. In such a scribe line, a variation in the depth is found. That is, in the scribe line $S_A$ a deep vertical crack $D_A$ is formed due to the grooves formed in the edge line portion, whereas in the scribe line $S_B$ a shallow vertical crack $D_B$ is formed because grooves are not formed in the edge line portion of the scribe line $S_B$.

Figure 2:
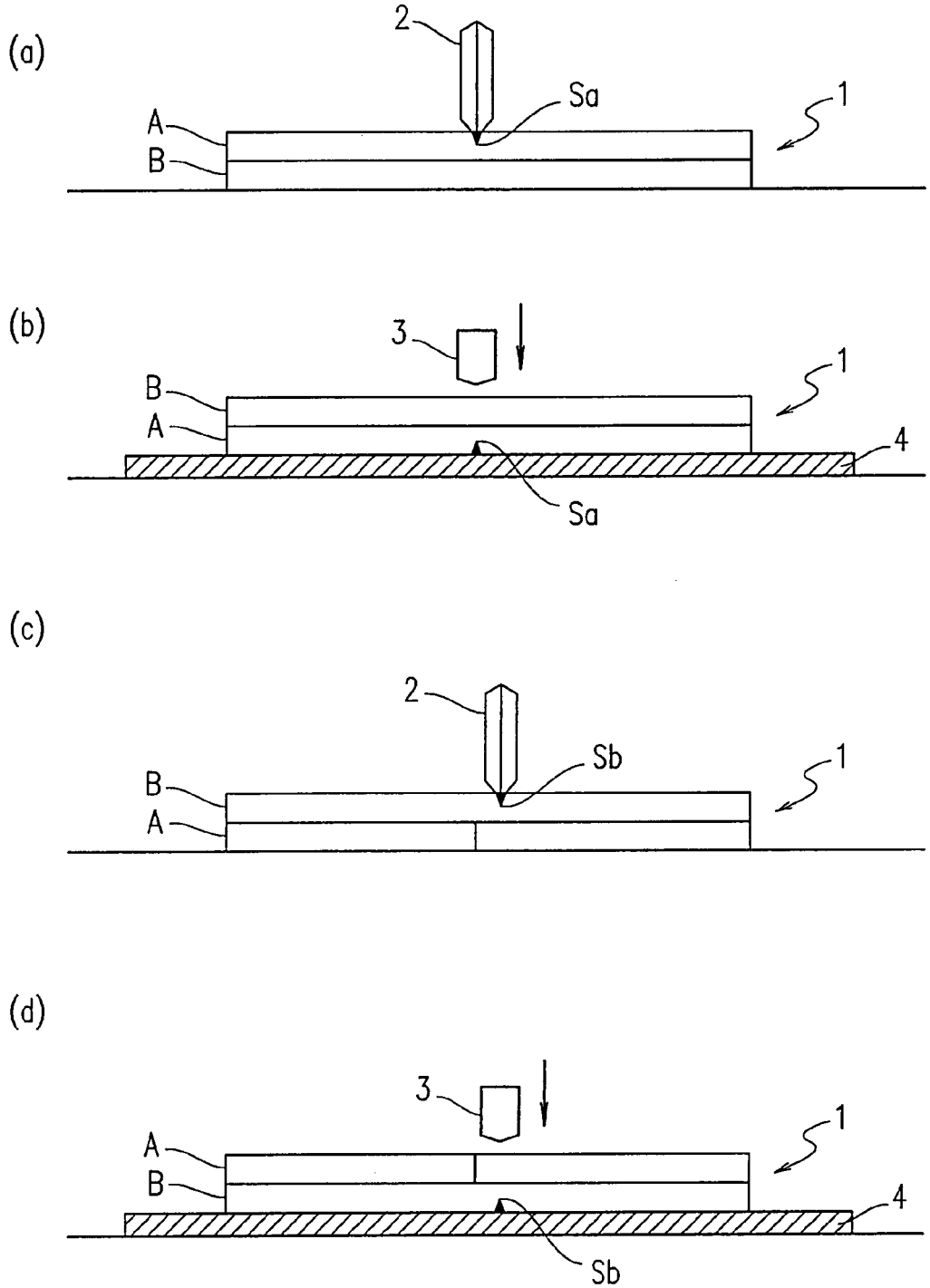
FIG. 2 illustrates another conventional separation procedure of a bonded glass panel.
Figure 3:
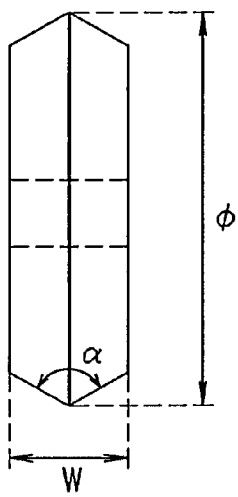
FIG. 3 is a front view of a glass cutter wheel.
Figure 4:
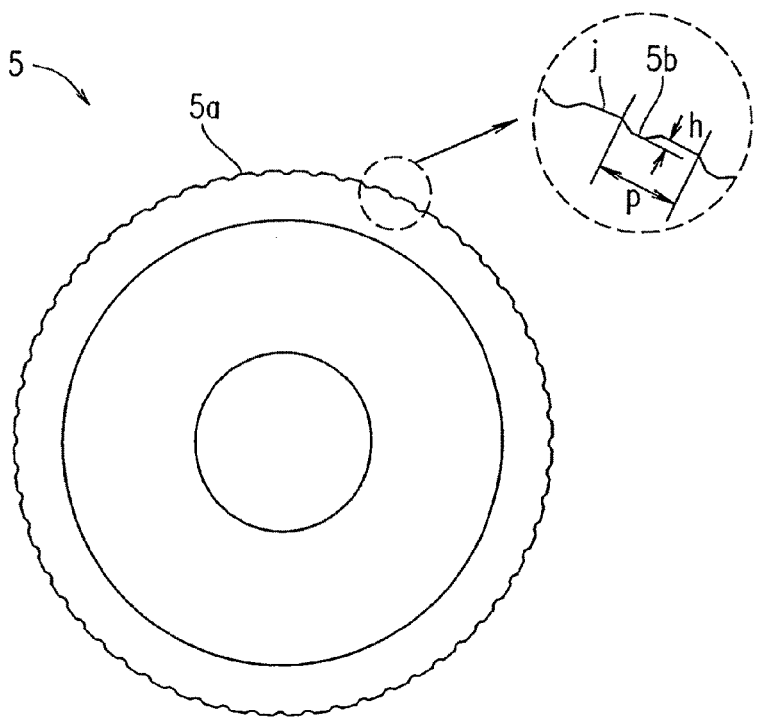
FIG. 4 is a side view of a glass cutter wheel where grooves are formed in an edge line portion of the wheel.

Thus, since the depth of the vertical crack periodically varies in the case of scribing performed using the glass cutter wheel 6 of embodiment 1, the scribing ability of the glass cutter wheel 6 is between the scribing ability of the conventional glass cutter wheel 2 of FIG. 2 and the scribing ability of the glass cutter wheel 5 of FIG. 4. Furthermore, by appropriately changing the ratio of the region A, where grooves are formed, and the region B, where grooves are not formed, with respect to the entire perimeter of the glass cutter wheel, a desired scribing characteristic can be obtained, i.e., a line of a desired-vertical crack for separating a glass substrate (scribe line) can be obtained.

Hereinafter, Examples 1-5 which illustrates specific examples of the glass cutter wheel of embodiment 1 are described.

Example 1

Figure 10:
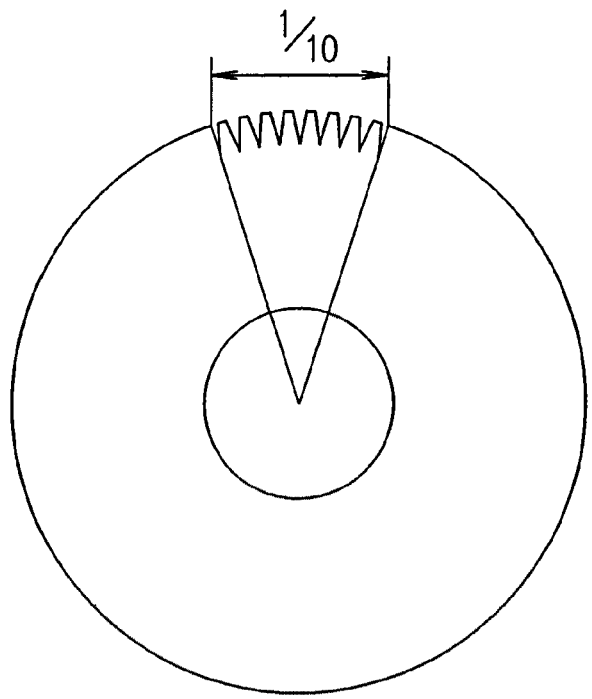
FIG. 10 is a side view showing a glass cutter wheel of Example 1.

FIG. 10 shows an embodiment of a glass cutter wheel of Example 1. TABLE 2 below shows dimensions of the glass cutter wheel of Example 1, such as a wheel diameter or the like.

TABLE 2

| | |
|---|---|
| Wheel diameter φ | 2.0 mm |
| Wheel thickness w | 0.65 mm |
| Blade edge angle α | 135° |
| Depth of groove | 7 μm |

The glass cutter wheel 6 of Example 1 was designed such that grooves having identical depths (7 μm) are continuously formed over a ⅒ portion (8 divisions/80 divisions) of the entire perimeter length of the edge line portion.

This glass cutter wheel 6 was used to scribe an alkali-free glass plate having a thickness of 0.7 mm with a blade edge load of 0.16 to 0.40 MPa and at a scribing speed of 400 mm/s. In the scribing process using the glass cutter wheel 6 of Example 1, a scribe line where the depth of a vertical crack periodically varies was formed as shown in FIG. 7. In the case where a load of 0.18 MPa was used, the deep vertical crack $D_A$ shown in FIG. 7 was about 400 μm, and the shallow vertical crack $D_B$ shown in FIG. 7 was about 100 μm.

Example 2

Figure 11:
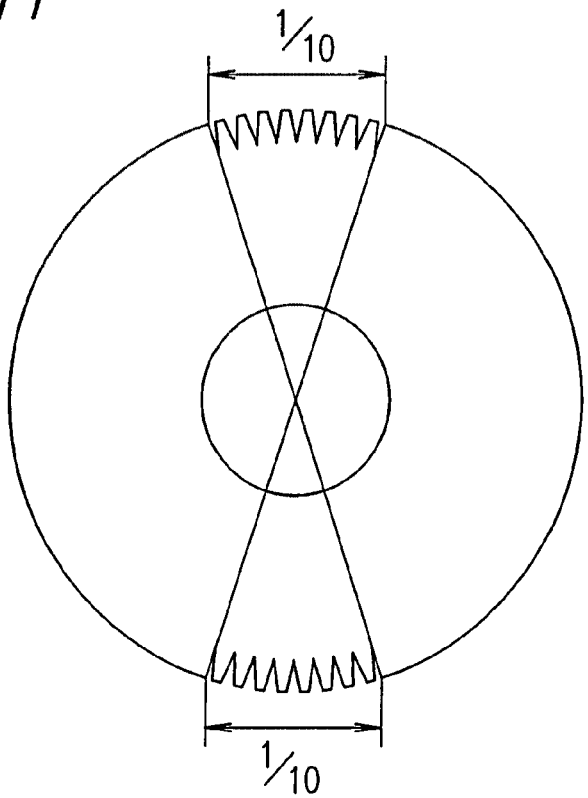
FIG. 11 is a side view showing a glass cutter wheel of Example 2.

FIG. 11 shows an embodiment of a glass cutter wheel 6 of Example 2. TABLE 3 below shows dimensions of the glass cutter wheel shown in FIG. 11, such as a wheel diameter or the like.

TABLE 3

| | |
|---|---|
| Wheel diameter φ | 2.0 mm |
| Wheel thickness w | 0.65 mm |
| Blade edge angle α | 135° |
| Depth of groove | 7 μm |

The glass cutter wheel 6 of Example 2 has regions A1 and A2 at two separated positions in the perimeter of the glass cutter wheel 6, each of which is a ⅒ portion (8 divisions/80 divisions) of the entire perimeter length of the edge line portion, where grooves having identical depths (7 μm) are continuously formed. Regions A1 and A2, where grooves are formed, are provided at opposite sides of the glass cutter wheel 6 with respect to the central axis of the glass cutter wheel 6.

This glass cutter wheel 6 was used to scribe an alkali-free glass plate having a thickness of 0.7 mm with a blade edge load of 0.16 to 0.40 MPa and at a scribing speed of 400 mm/s. In the scribing process using the glass cutter wheel 6 of Example 2, a scribe line where the depth of a vertical crack periodically varies was formed as shown in FIG. 7. In the case where a load of 0.20 MPa was used, the deep vertical crack $D_A$ shown in FIG. 7 was about 400 μm, and the shallow vertical crack $D_B$ shown in FIG. 7 was about 100 μm.

Example 3

Figure 12:
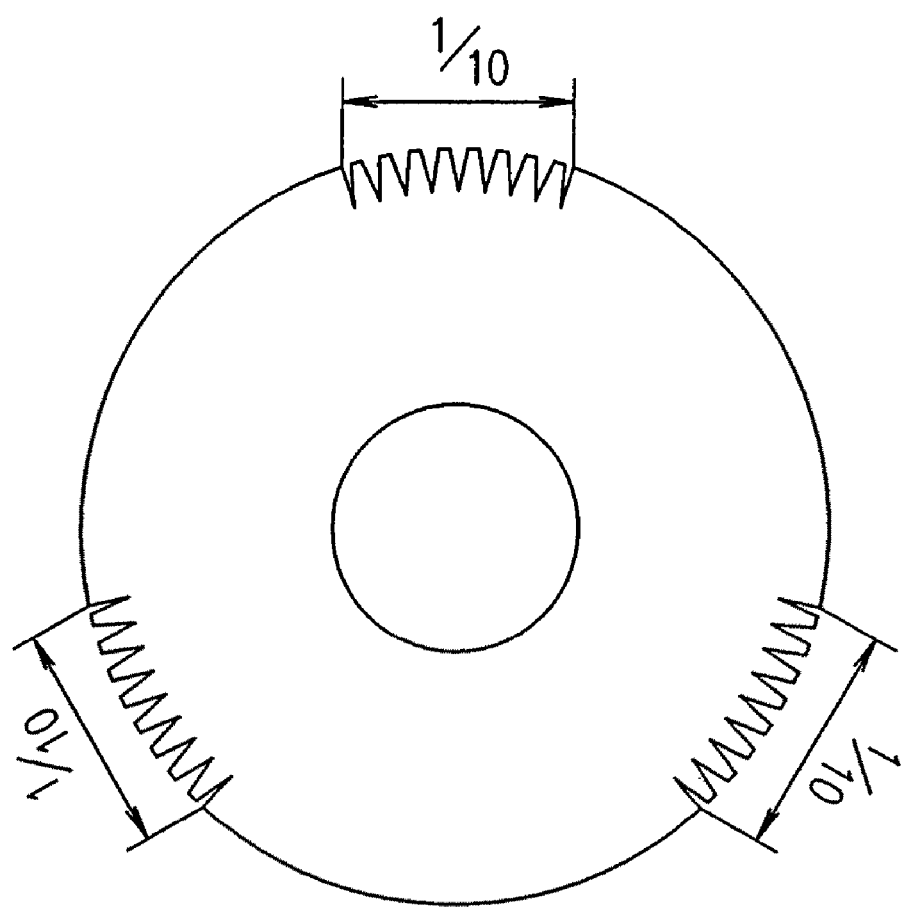
FIG. 12 is a side view showing a glass cutter wheel of Example 3.

FIG. 12 shows an embodiment of a glass cutter wheel 6 of Example 3. TABLE 4 below shows dimensions of the glass cutter wheel 6 of Example 3, such as a wheel diameter or the like.

TABLE 4

| | |
|---|---|
| Wheel diameter φ | 2.0 mm |
| Wheel thickness w | 0.65 mm |
| Blade edge angle α | 135° |
| Depth of groove | 7 μm |

The glass cutter wheel 6 of Example 3 has regions A1, A2, and A3 at three separated positions in the perimeter of the glass cutter wheel 6, each of which is a ⅒ portion (8 divisions/80 divisions) of the entire perimeter length of the edge line portion, where grooves having identical depths (7 μm) are continuously formed. Regions A1, A2, and A3 are provided at uniform intervals.

This glass cutter wheel 6 was used to scribe an alkali-free glass plate having a thickness of 0.7 mm with a blade edge load of 0.16 to 0.40 MPa and at a scribing speed of 400 mm/s. In the scribing process using the glass cutter wheel 6 of Example 3, a scribe line where the depth of a vertical crack periodically varies was formed as shown in FIG. 7. In the case where a load of 0.20 MPa was used, the deep vertical crack $D_A$ shown in FIG. 7 was about 400 μm, and the shallow vertical crack $D_B$ shown in FIG. 7 was about 100 μm.

Example 4

Figure 13:
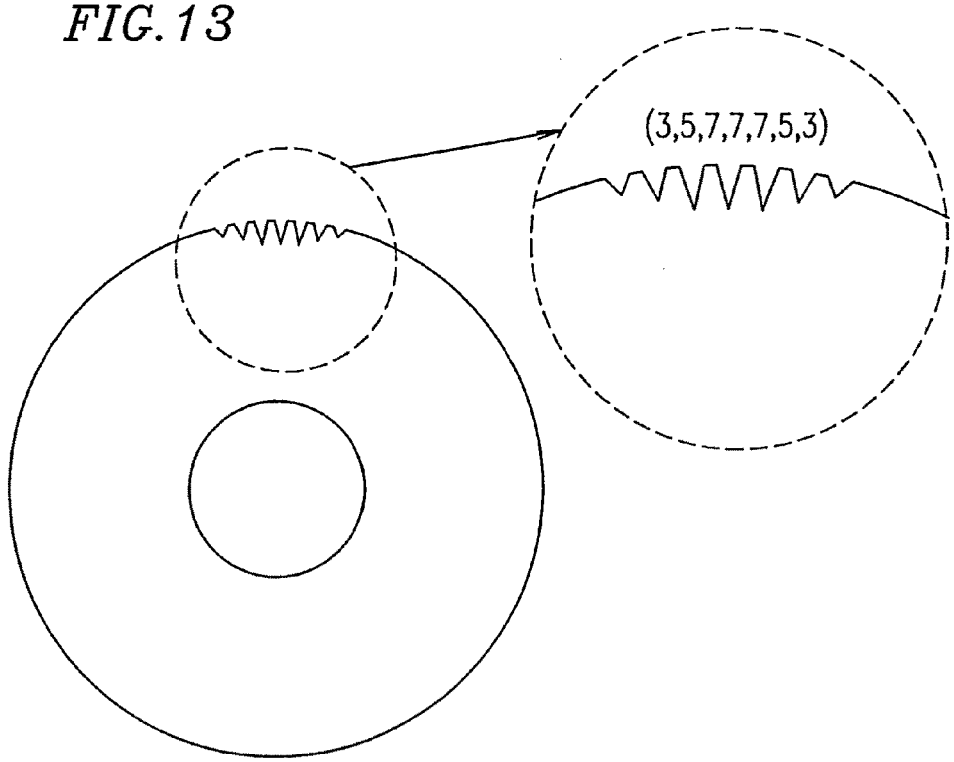
FIG. 13 is a side view showing a glass cutter wheel of Example 4.

FIG. 13 shows an embodiment of a glass cutter wheel 6 of Example 4. TABLE 5 below shows dimensions of the glass cutter wheel 6 of Example 4, such as a wheel diameter or the like.

TABLE 5

| | |
|---|---|
| Wheel diameter φ | 2.0 mm |
| Wheel thickness w | 0.65 mm |
| Blade edge angle α | 135° |
| Depth of groove | 3, 5, 7, 7, 7, 5, 3 μm |

The glass cutter wheel 6 of Example 4 has region A at a position in the perimeter of the glass cutter wheel 6, which is a ¹/₁₀ portion (8 divisions/80 divisions) of the entire perimeter length of the edge line portion. In region A, seven grooves are formed. These grooves are designed so as to have different depths, 3, 5, 7, 7, 7, 5, 3 μm, in this order.

This glass cutter wheel 6 was used to scribe an alkali-free glass plate having a thickness of 0.7 mm with a blade edge load of 0.16 to 0.40 MPa and at a scribing speed of 400 mm/s. In the scribing process using the glass cutter wheel 6 of Example 4, a scribe line where the depth of a vertical crack periodically varies was formed as shown in FIG. 7. In the case where a load of 0.22 MPa was used, the deep vertical crack $D_A$ shown in FIG. 7 was about 400 μm, and the shallow vertical crack $D_B$ shown in FIG. 7 was about 100 μm.

Example 5

Figure 14:
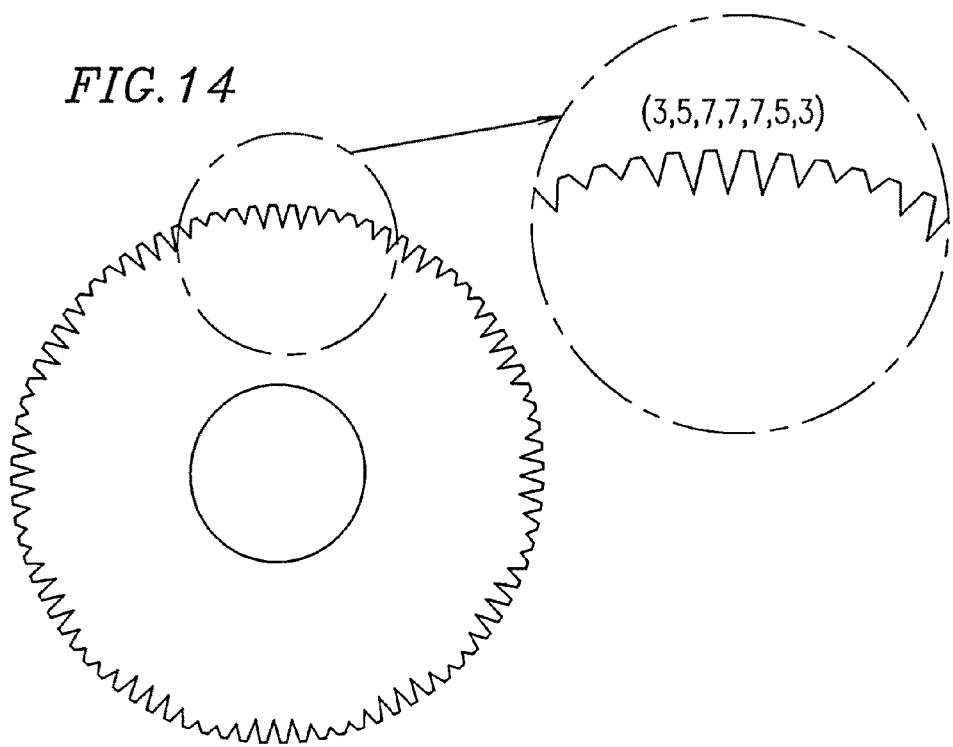
FIG. 14 is a side view showing a glass cutter wheel of Example 5.

FIG. 14 shows an embodiment of a glass cutter wheel 6 of Example 5. TABLE 6 below shows dimensions of the glass cutter wheel 6 of Example 5, such as a wheel diameter or the like.

TABLE 6

| | |
|---|---|
| Wheel diameter φ | 2.0 mm |
| Wheel thickness w | 0.65 mm |
| Blade edge angle α | 140° |
| Number of divisions | 106 |
| Depth of groove | 3, 5, 7, 7, 7, 5, 3 μm |

In the glass cutter wheel 6 of Example 5, the entire perimeter of the edge line portion is divided into 106 divisions, such that grooves having lengths of 3, 5, 7, 7, 7, 5, and 3 μm are repeatedly formed in this order along the entire perimeter.

This glass cutter wheel 6 was used to scribe an alkali-free glass plate having a thickness of 0.7 mm with a blade edge load of 0.16 to 0.40 MPa and at a scribing speed of 400 mm/s. In the scribing process using the glass cutter wheel 6 of Example 5, a scribe line where the depth of a vertical crack periodically varies was formed as shown in FIG. 7. In the case where a load of 0.29 MPa was used, the deep vertical crack $D_A$ shown in FIG. 7 was about 400 μm, and the shallow vertical crack $D_B$ shown in FIG. 7 was about 100 μm.

From the above results of Examples 1-5, it was found that a pitch of the plurality of grooves continuously formed is preferably 20-200 μm according to the wheel diameter of 1-20 mm, and that the depth of the plurality of grooves is preferably 2-200 μm according to the wheel diameter of 1-20 mm.

In the drawings used for illustrating the above-described cutter wheels of the present invention, the grooves formed at the edge line of the cutter wheel are shown in a large size for the purpose of readily recognizing the grooves. However, the actual size of the grooves is a size of the micron order, which is not perceptible by a human eye.

Next, a method for separating the bonded glass substrate 1 using a separation apparatus which has the glass cutter wheel 6 of embodiment 1 is described. The scribing apparatus used in the following description is a scribing apparatus which has a mechanism for achieving a θ rotation of a table, on which a glass plate is mounted, and for moving the table along the X-direction and/or Y-direction with respect to a cutter head.

Figure 19:
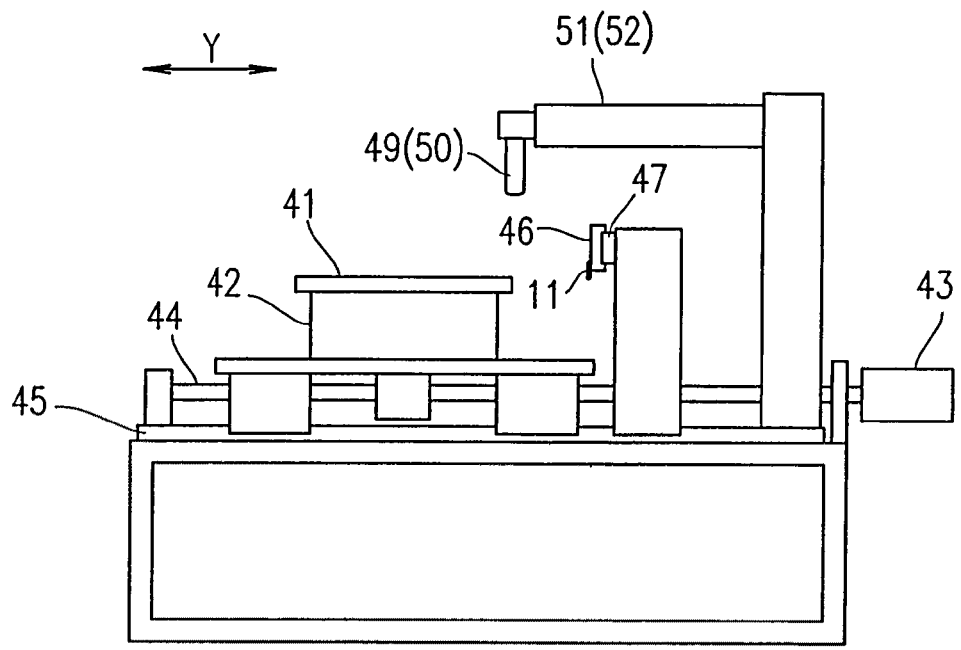
FIG. 19 is a front view of a scribing apparatus used in embodiment 1.
Figure 20:
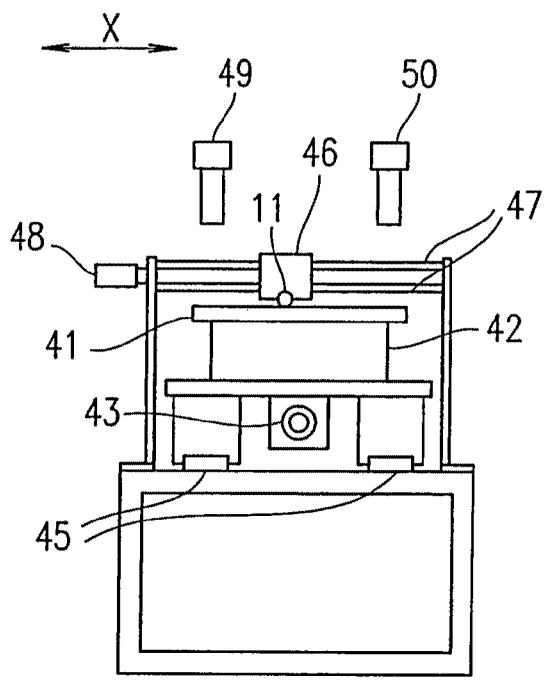
FIG. 20 is a side view of a scribing apparatus used in embodiment 1.

FIGS. 19 and 20 show an example of a scribing apparatus, where a table performs a θ rotation and moves along the Y-direction, and a cutter head moves along the X-direction. FIG. 19 is a front view of the scribing apparatus, and FIG. 20 is a side view of the scribing apparatus.

As shown in FIGS. 19 and 20, this scribing apparatus has a table 41 on which a glass plate is mounted. The table 41 is supported by a rotation table 42 so as to be rotatable along a horizontal direction, and can be moved along the Y-direction (leftward/rightward directions in FIG. 19) by rotation of a ball screw 44. Furthermore, a cutter head 46, to which the above-described glass cutter wheel 11 of the present invention is rotatably attached such that the glass cutter wheel 11 is rotatable around its shaft, is movably supported along a rail 47 so as to be movable along the X-direction (leftward/rightward directions in FIG. 20).

In the case where scribing is performed using this scribing apparatus, the cutter head 46 is moved along the X-direction every time the table 41 is moved along the Y-direction at a predetermined pitch, whereby a glass plate mounted on the table 41 is scribed along the X-direction. Thereafter, the table 41 is rotated by the rotation table 42 by 90°, and scribing is performed in the same manner as described above, whereby a scribe line which crosses at right angles with the previously formed scribe line can be formed on the glass plate.

In the above scribing apparatus, reference numeral 43 denotes a table feed motor for moving the table 41 along the Y-direction; reference numeral 45 denotes a rail for supporting the rotation table 42 such that the rotation table 42 is movable along the Y-direction; reference numeral 48 denotes a cutter shaft motor for rotating the rotatably-supported glass cutter wheel 11; reference numerals 49 and 50 denote CCD cameras for monitoring a glass substrate which is scribed on the table 41; and reference numeral 51 denotes a camera supporting metal member for supporting the CCD cameras 49 and 50.

Figure 8:
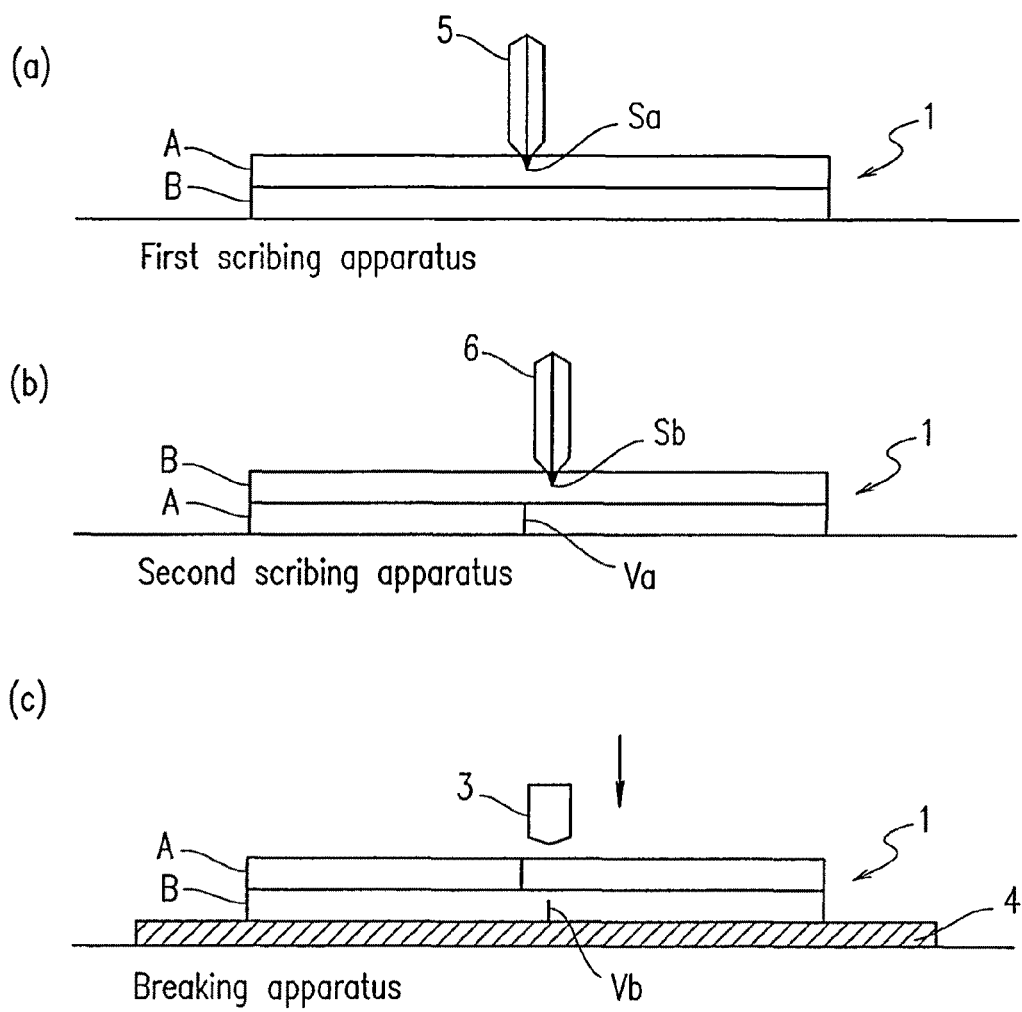
FIG. 8 illustrates a separation procedure using a scribing apparatus which incorporates a glass cutter wheel of the present invention.

FIGS. 8(*a*) through 8(*c*) are cross-sectional views which illustrate a method for separating a bonded glass substrate 1 using a separation apparatus which incorporates the glass cutter wheel 6 of embodiment 1, in a step-by-step manner. In the following descriptions, in a bonded glass substrate formed by a pair of glass substrates, which is a liquid crystal mother substrate, one of the glass substrates is referred to as an A-side glass substrate, and the other glass substrate is referred to as a B-side glass substrate, for convenience of explanation.

(1) First, as shown in FIG. 8(*a*), the bonded glass substrate 1 is placed on a first scribing apparatus such that the A-side glass substrate is laid over the B-side glass substrate, and the A-side glass substrate is scribed using the glass cutter wheel 5 so as to form a scribe line Sa. The first scribing apparatus uses the glass cutter wheel 5 shown in FIG. 4, which has grooves along its entire perimeter. In the scribe line Sa formed using this glass cutter wheel 5, a deep vertical crack which reaches the vicinity of the lower surface of the A-side glass substrate, indicated by Va in the drawings, is formed.

(2) Next, the bonded glass substrate 1 where the scribe line Sa was formed in the A-side glass substrate is turned over, and transported to a second scribing apparatus. In this second scribing apparatus, the B-side glass substrate of the bonded glass substrate 1 is scribed using the glass cutter wheel 6 so as to form a scribe line Sb which is parallel to the scribe line Sa as shown in FIG. 8(*b*). The second scribing apparatus uses the glass cutter wheel 6 described in any of Examples 1-5. In the scribe line Sb formed using this glass cutter wheel 6, a vertical crack Vb which alternately includes shallow portions and deep portions on a periodic basis is formed. It should be herein noted that, in the case of a liquid crystal mother substrate, a plurality of liquid crystal panels are formed from the liquid crystal mother substrate, and in each liquid crystal panel, it is necessary to form terminals at a side edge portion in one glass substrate. Thus, in many cases, the scribing position of the scribe line Sa formed in the A-side glass substrate and the scribing position of the scribe line Sb formed in the B-side glass substrate are shifted from each other along a horizontal direction.

(3) Next, the bonded glass substrate 1 where the scribe lines Sa and Sb were formed in the A-side glass substrate and the B-side glass substrate, respectively, is turned over such that the A-side glass substrate is over the B-side glass substrate, and transported to a breaking apparatus. In this breaking apparatus, as shown in FIG. 8(c), the bonded glass substrate 1 is placed on a mat 4. A break bar 3 is pushed against the A-side glass substrate of the bonded glass substrate 1 along the scribe line Sb formed in the B-side glass substrate. As a result, in the lower B-side glass substrate, a crack extends upwardly from the scribe line Sb, and accordingly, the B-side glass substrate is broken along the scribe line Sb.

By sequentially performing above steps (1) through (3), the bonded glass substrate 1 is separated.

As previously described, in a scribing process using the glass cutter wheel 6 of the present invention, the vertical crack Vb which alternately includes shallow portions and deep portions on a periodic basis is formed, so that the vertical crack Vb does not thoroughly penetrate through the glass substrate in the thickness direction thereof. Thus, even when the A-side glass substrate is completely separated during when the bonded glass substrate 1 is transported from the second scribing apparatus to the breaking apparatus at Step (2), there is no probability that the bonded glass substrate 1 is separated because the A-side glass substrate is kept bonded to the B-side glass substrate.

FIGS. 9(a) through 9(d) are cross-sectional views for illustrating a second method for separating a bonded glass substrate 1 using a separation apparatus which incorporates the glass cutter wheel 6 of embodiment 1, in a step-by-step manner. In the following descriptions, in a bonded glass substrate formed by a pair of glass substrates, which is a liquid crystal mother substrate, one of the glass substrates is referred to as an A-side glass substrate, and the other glass substrate is referred to as a B-side glass substrate, for convenience of explanation.

(1) First, as shown in FIG. 9(a), the bonded glass substrate 1 is placed on a first scribing apparatus such that the A-side glass substrate is laid over the B-side glass substrate, and the A-side glass substrate is scribed using the glass cutter wheel 2 so as to form a scribe line Sa. The vertical crack Va formed using this glass cutter wheel does not result in a deep vertical crack which reaches the vicinity of the lower surface of the glass substrate.

(2) Next, the bonded glass substrate 1 where the scribe line Sa was formed in the A-side glass substrate is turned over, and transported to a first breaking apparatus. In this first breaking apparatus, as shown in FIG. 9(b), the bonded glass substrate 1 is placed on a mat 4. A break bar 3 is pushed against the B-side glass substrate of the bonded glass substrate 1 along the scribe line Sa formed in the A-side glass substrate. As a result, in the lower A-side glass substrate, a crack extends upwardly from the scribe line Sa, and accordingly, the A-side glass substrate is broken along the scribe line Sa.

(3) Next, the bonded glass substrate 1 where the A-side glass substrate was separated is transported to a second scribing apparatus without being turned over, i.e., without exchanging the positions of the A-side glass substrate and the B-side glass substrate. In this second scribing apparatus, the B-side glass substrate of the bonded glass substrate 1 is scribed using a glass cutter wheel 6 so as to form a scribe line Sb which is parallel to the scribe line Sa as shown in FIG. 9(c).

It should be herein noted that, in the case of a liquid crystal mother substrate, a plurality of liquid crystal panels are formed from the liquid crystal mother substrate, and in each liquid crystal panel, it is necessary to form terminals at a side edge portion in one glass substrate. Thus, in many cases, the scribing position of the scribe line Sb formed in the B-side glass substrate and the scribing position of the scribe line Sa formed in the A-side glass substrate are shifted from each other along a horizontal direction.

(4) Next, the resultant bonded glass substrate 1 is turned over such that the A-side glass substrate is over the B-side glass substrate, and transported to a second breaking apparatus. In this second breaking apparatus, as shown in FIG. 9(d), the bonded glass substrate is placed on a mat 4. The break bar 3 is pushed against the A-side glass substrate of the bonded glass substrate 1 along the scribe line Sb formed in the B-side glass substrate. As a result, in the lower B-side glass substrate, a crack extends upwardly from the scribe line Sb, and accordingly, the B-side glass substrate is broken along the scribe line Sb. A vertical crack formed at the time of formation of the scribe line Sb in the B-side glass substrate at Step (3) is indicated by Vb in FIG. 9(d).

As described above, in a scribing process using the glass cutter wheel 6 of the present invention, the vertical crack Vb which alternately includes shallow portions and deep portions on a periodic basis is formed, so that the vertical crack Vb does not thoroughly penetrate through the glass substrate along the thickness direction thereof. Thus, even when the A-side glass substrate is completely separated during when the bonded glass substrate 1 is transported from the second scribing apparatus to the second breaking apparatus at Step (4), there is no probability that the bonded glass substrate 1 is separated because the B-side glass substrate is not thoroughly separated.

In the above, the scribing methods for a bonded glass substrate have been described. As a special case, a different brittle material may be scribed using the scribing method of the present invention. In this case also, a vertical crack which alternately includes shallow portions and deep portions on a periodic basis can be formed in the different brittle material. By forming such a vertical crack having the depth which periodically varies, the brittle material can be transported to a next step without causing a thorough separation during transportation.

Next, a glass cutter wheel production apparatus for producing a glass cutter wheel where undulations are formed at a blade edge portion as shown in FIG. 5 is described.

Figure 15:
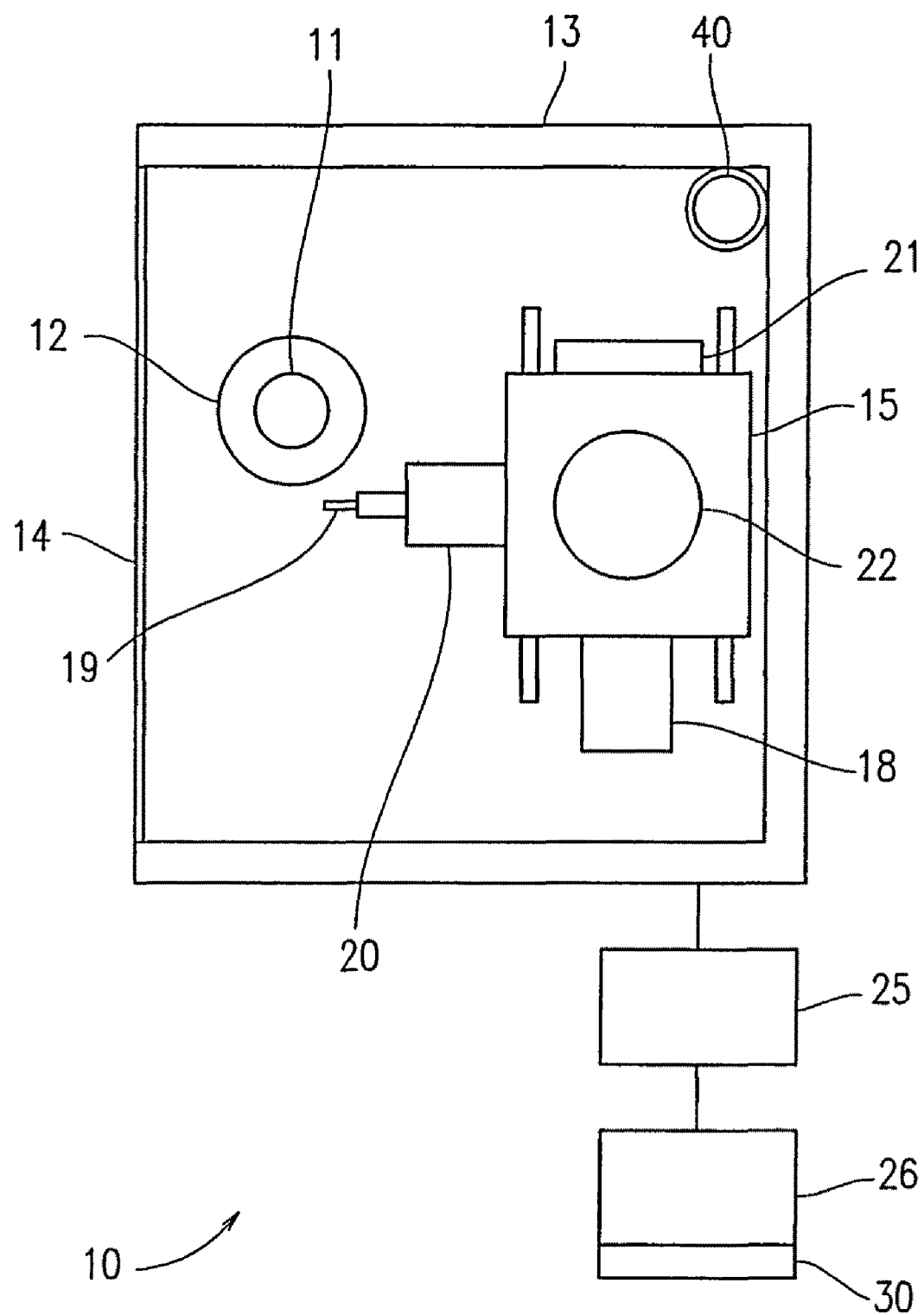
FIG. 15 is a plan view showing a general structure of a glass cutter wheel production apparatus of embodiment 2.

FIG. 15 is a plan view showing a general structure of a glass cutter wheel production apparatus of embodiment 2 of the present invention.

This glass cutter wheel production apparatus 10 has a structure for grinding an edge line portion of a blade edge of a glass cutter wheel so as to form grooves in the blade edge.

The glass cutter wheel production apparatus 10 has a housing 13 in which a grindstone 12 rotatably supported by, and fixed to, a spindle motor 11 is placed. In a front face of the housing 13, a door portion 14 is provided which can be opened for introducing or removing a glass cutter wheel to be ground. The door portion 14 is used for a safety door, in which a safety control device (not shown) is provided for interrupting a grinding step when the door is opened during grinding of a glass cutter wheel.

Inside the housing 13, a grinding mechanism 15 is provided so as to advance toward and retract from the grindstone 12. Advancement/retraction of the grinding mechanism 15 toward/from the grindstone 12 are achieved by a feeding motor 18. The feeding motor 18 can adjust movement of the grinding mechanism 15 to and from a certain position by rotating a ball screw (not shown).

The grinding mechanism 15 has a wheel supporting portion 19 for supporting a glass cutter wheel during grinding. At a rear portion of the wheel supporting portion 19, a blade edge rotation motor 20 is provided for rotating the glass cutter wheel by a preset angle. Furthermore, the grinding mechanism 15 has a handle 21 for alignment in the horizontal direction and a handle 22 for alignment in the vertical direction. With these handles, alignment in the horizontal and vertical directions is adjusted manually, or automatically using a control mechanism (not shown).

Outside the housing 13, a control device 25 for controlling the position and operation of the grinding mechanism 15 is provided. Furthermore, the control device 25 has a manipulation section 26 for designating grinding conditions for grinding of a glass cutter wheel by the grinding mechanism 15.

Figure 16:
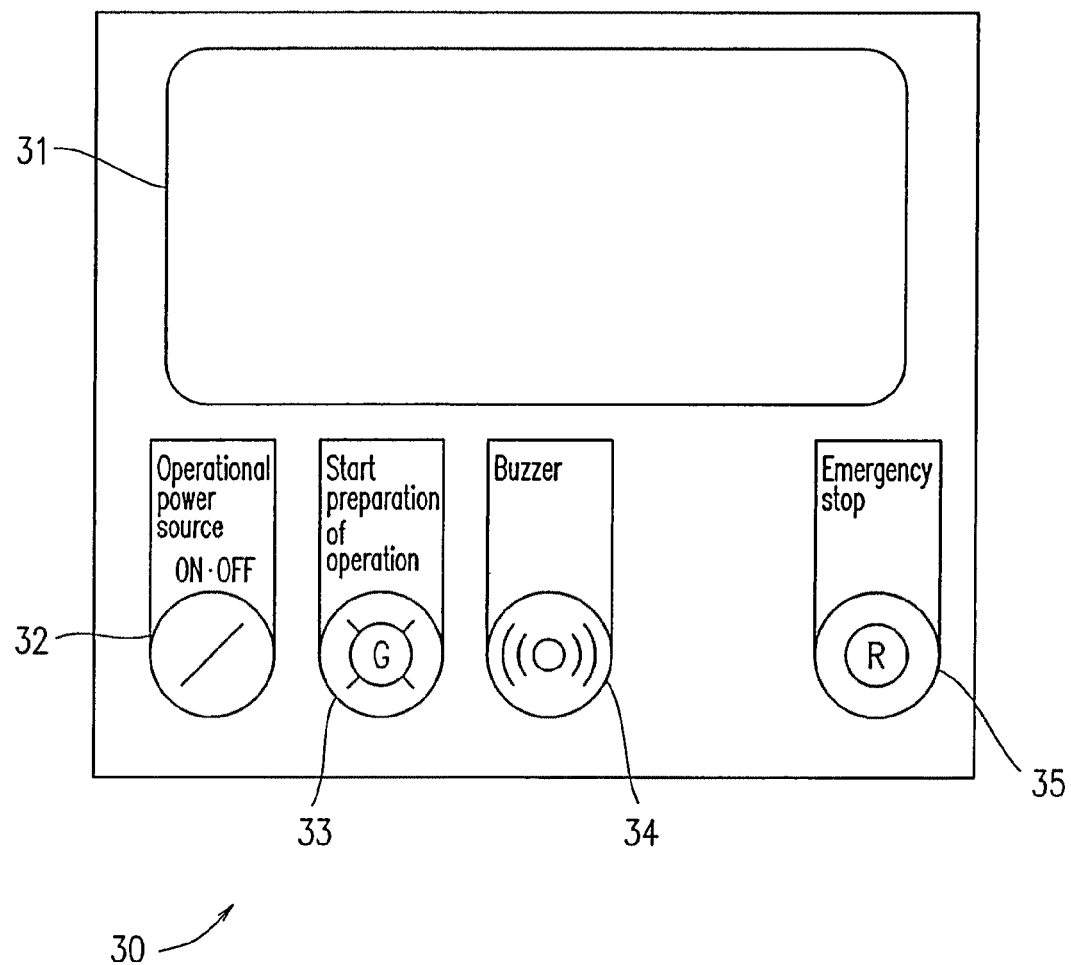
FIG. 16 shows an example of a touch panel incorporated in a manipulation section of a glass cutter wheel production apparatus.

In the manipulation section 26, for example, a touch panel 30 shown in FIG. 16 is provided. In the touch panel 30 which is shown as an example in FIG. 16, a touch panel manipulation portion 31 is provided, on which various operation modes, set conditions, alarming, etc., for the entire apparatus are displayed. In the lower part of the touch panel 30, a power switch 32 for manipulating the power on and power off of an operational power source, an illumination-type push button switch 33 for designating start of operation preparation, a warning buzzer 34 for emitting warning information, and an emergency stop push button switch 35 for providing an instruction to stop the operation in an emergency are provided.

Figure 17:
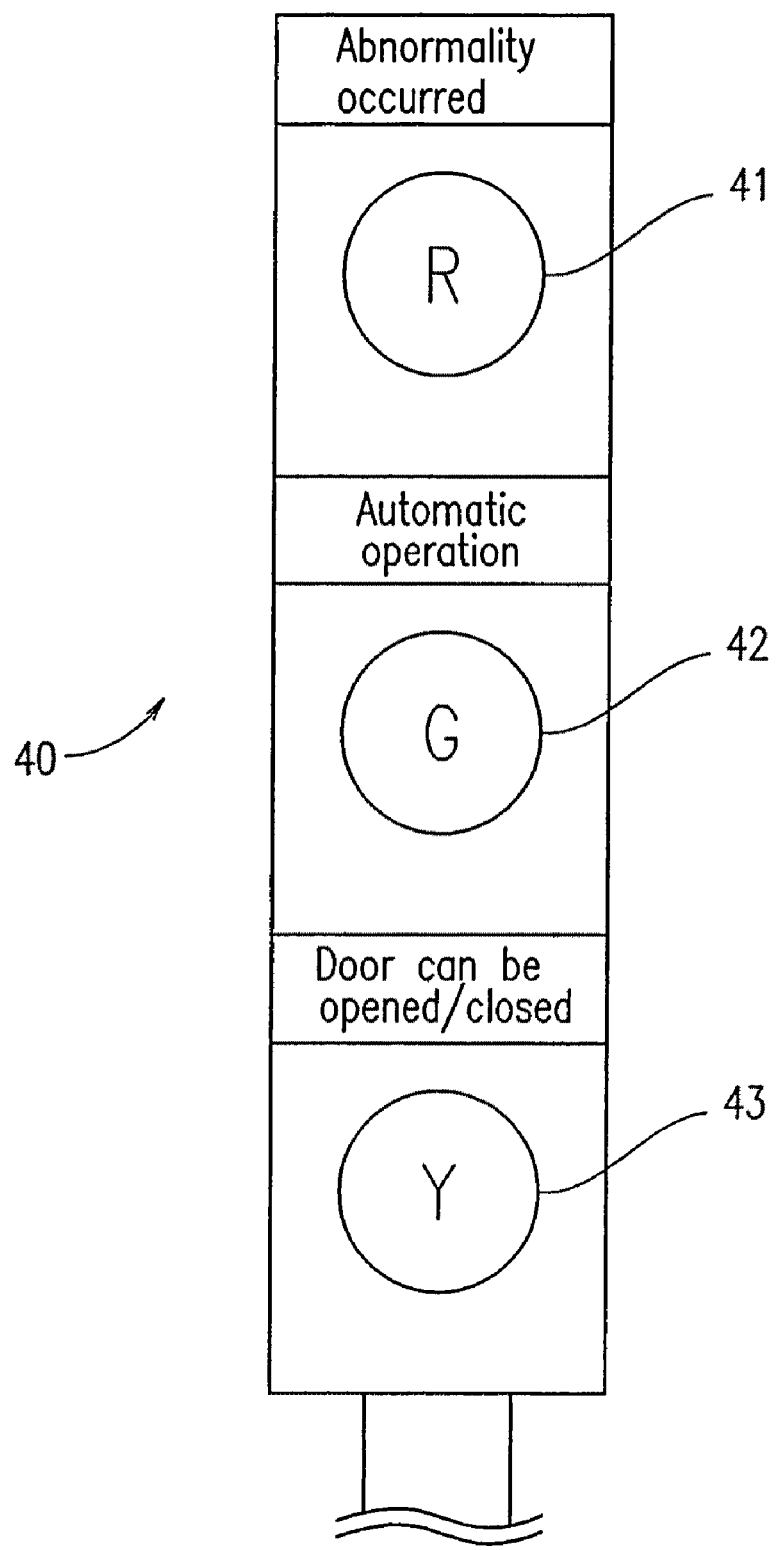
FIG. 17 is an example of a patrol light incorporated in a glass cutter wheel production apparatus.

Furthermore, a signal tower 40 is provided on the housing 13. The signal tower 40 is an indication light which indicates the status of the inside of the housing, e.g., an abnormality has occurred, the apparatus is in automatic operation, there is no problem in opening/closing the door, etc. FIG. 17 shows an example of the signal tower 40. In this example, there are provided a "red" indication light 41 which indicates that an abnormality has occurred in the housing 13, a "green" indication light 42 which indicates that the operation performed inside the housing 13 is automatic, and a "yellow" indication light 43 which indicates that there is no problem in opening/closing the door.

Next, an operation of the glass cutter wheel production apparatus 10 having the above structure is described.

First, the manipulation section 26 is manipulated to perform initial setting of grinding conditions for a glass cutter wheel to be ground.

Figure 18:
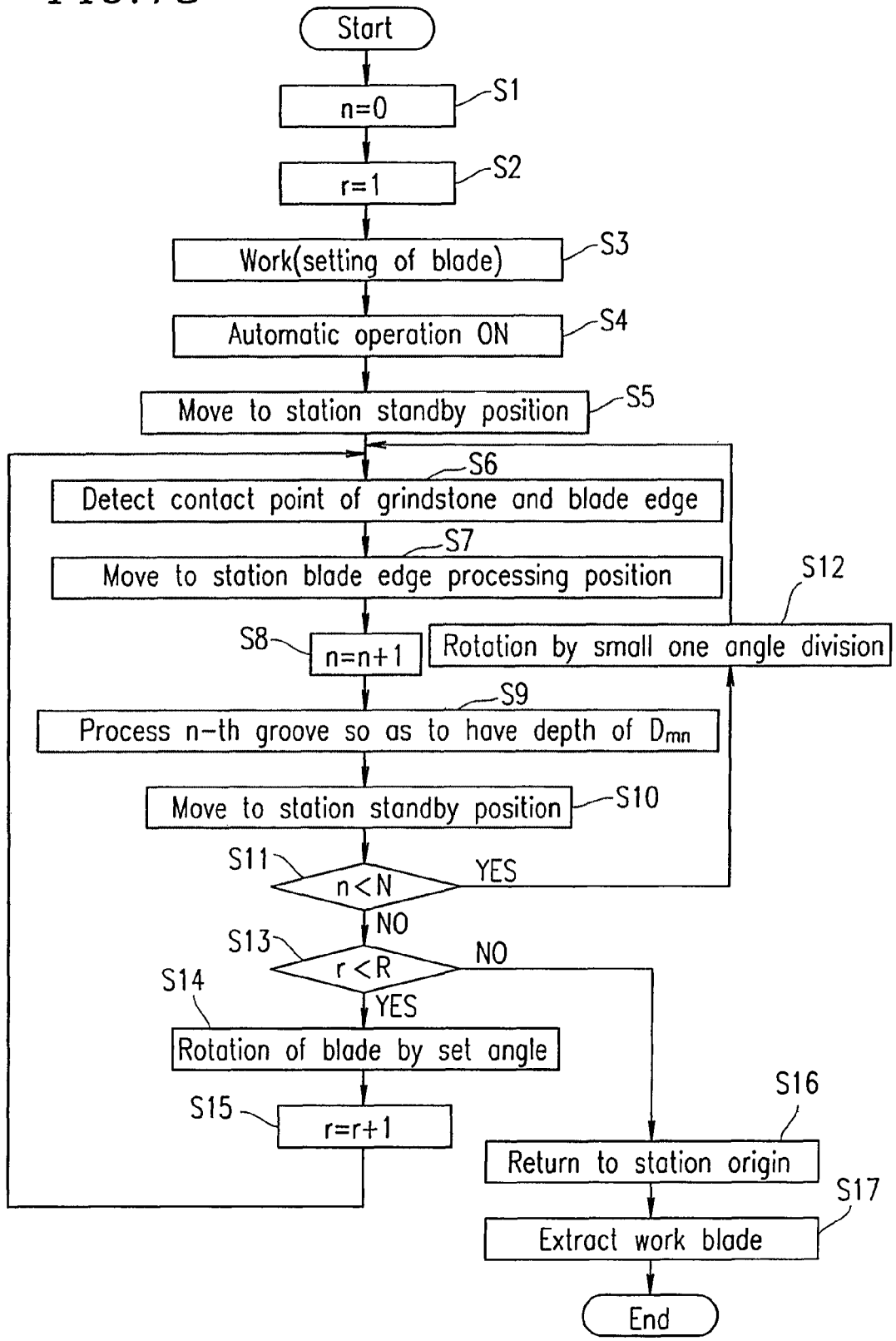
FIG. 18 is a flowchart for illustrating steps of grinding process of a glass cutter wheel.

In this initial setting, for example, the following conditions are input:

Rotation angle number ratio $F_1$ in the first region; depth of groove, $D_{11}, \ldots, D_{1n}$ Rotation angle number ratio $F_2$ in the second region; depth of groove, $D_{21}, \ldots, D_{2n}$ Rotation angle number ratio $F_m$ in the m-th region; depth of groove, $D_{m1}, \ldots, D_{mn}$ Number of loops: L Number of divisions in one region: N Depth of groove: D1, D2, . . . , Dn Number of region: R After the initial settings have been input, a step of grinding a glass cutter wheel is begun. FIG. 18 is a flowchart which illustrates the step of grinding a glass cutter wheel. Hereinafter, the step of grinding a glass cutter wheel is described based on this flowchart.

First, at Step 1, the number of divisions is set to 0 (n=0), and then at Step 2, the number of regions is set to 1 (r=1).

Next, at Step 3, a glass cutter wheel to be ground is attached to the wheel supporting portion 19.

Next, the manipulation section 26 is manipulated to start an automatic operation of the grinding mechanism 15.

Next, a position where a tip of the grindstone 12 comes into contact with a blade edge of the glass cutter wheel is detected. In detection of the contact position, optical means, mechanical means, or electrical means may be used. Detection of a contact of the blade edge of the glass cutter wheel with the grindstone 12 is performed every time the blade edge comes into contact with the grindstone 12.

When a position where the tip of the grindstone 12 comes into contact with the blade edge is detected, the grinding mechanism 15 is moved back to a standby position by the feeding motor 18 at Step 6.

Next, at Step 7, the blade edge rotation motor 20 is rotated so that the glass cutter wheel supported by the wheel supporting portion 19 by a predetermined angle.

Next, at Step 8, the number of division, n, is updated to (n+1) by adding 1 to n.

Next, at Step 9, the grinding mechanism 15 is moved toward the grindstone 12 such that the blade edge comes in contact with the grindstone 12, and that the n-th groove is processed so as to have the depth of Dmn.

At Step 9, grooves are formed such that the n-th groove in the m-th region R has depth Dmn, which corresponds to an input value previously set in the above-described initial setting step. Similarly, the rotation angle number in the m-th region R is previously set based on the rotation angle number ratio $F_m$ in the m-th region, which is an input value set in the above-described initial setting step, for formation of the grooves.

Next, at Step 10, the grinding mechanism 15 is moved to the standby positions.

Next, at Step 11, the number of divisions n and the number of divisions N are compared to examine whether or not n<N is satisfied. If n<N is satisfied, the process proceeds to Step 12. If n<N is not satisfied, the process proceeds to Step 13.

When it is confirmed that n<N is satisfied, and the process proceeds to Step 12, the blade edge rotation motor 20 is rotated by a very small angle at Step 12. Then, the process returns to Step 6, and grinding processing is performed at a position of the blade edge rotated by the very small angle.

When it is confirmed at Step 11 that n<N is not satisfied, this means that when the number of divisions n has already reached the number of divisions N, the process proceeds to Step 13, and it is examined at Step 13 whether or not r<R is satisfied.

When it is confirmed at Step 13 that r<R is satisfied, the process proceeds to Step 14. At Step 14, the blade edge is rotated by the blade edge rotation motor 20 by a set angle.

Subsequently, the process proceeds to Step 15. At Step 15, the set number of regions, r, is updated to (r+1) by adding 1. After update of the number of regions at Step 15, the process returns to Step 6, and the grinding processing is again performed.

When it is confirmed at Step 13 that r<R is not satisfied, this means that when the number of regions r has already reached the initially-set number of regions R, the process proceeds to Step 16, and the grinding mechanism 15 is moved back to their original positions.

Next, at Step 17, the glass cutter where the blade edge has been ground is removed, and the grinding process terminates.

By using the above-described glass cutter wheel production apparatus 10 of embodiment 2, a groove having a desired depth can be formed at a desired position of the entire perimeter of a blade edge with satisfactory accuracy.

In the cutter wheel production apparatus shown in FIG. 15, one grinding mechanism 15 is provided for the grindstone 12. However, a structure where a grindstone is positioned at about the center of the housing, and a plurality of grinding mechanisms are provided such that the grindstone is surrounded by the grinding mechanisms, may be employed. With such a structure, the processing efficiency of a cutter wheel can be significantly increased relative to the number of the grinding mechanisms provided.

Alternatively, a plurality of grindstones may be vertically piled up and arranged such that blade edges of a plurality of cutter wheels face the respective grindstones. Alternatively, a structure where a plurality of cutter wheels can be attached to one cutter wheel supporting portion of a grinding mechanism, and the plurality of cutter wheels can be ground simultaneously in one grinding step, may be employed. With such a structure, the processing efficiency of a cutter wheel can be significantly increased.

INDUSTRIAL APPLICABILITY

As described above, according to the present invention, in a glass cutter wheel where a blade edge is formed in a disk-shaped wheel, grooves having a predetermined shape are formed at a predetermined pitch in 3/4 or less of the blade edge line portion of the entire perimeter of the blade edge. Such a glass cutter wheel has good processability in comparison to a glass cutter wheel where grooves are formed over the entire perimeter of the blade edge.

Another glass cutter wheel where grooves are formed at a predetermined pitch in 1/4 or less portion of the entire perimeter of the blade edge can prevent formation of a vertical crack which reaches the vicinity of a lower surface of a substrate. By changing the ratio of grooves with respect to the entire perimeter length, a desired scribing characteristic can be obtained. Thus, by changing the scribing characteristic, separation of a glass substrate at a scribe line position and the dropping of the separated glass substrate, which may occur during transportation of the glass substrate, can be obviated.

The invention claimed is:

1. A scribing method comprising:
providing a brittle material separation scribing wheel having a central portion in a thickness direction protruding in a circumferential direction so as to form a blade edge having a predetermined non-zero blade edge angle at an edge line portion of the wheel,
wherein the edge line portion of the scribing wheel comprises at least one region (A) and at least one region (B),
region (A) is a region where a plurality of grooves having a predetermined shape are formed in the edge line portion with a predetermined pitch, while region (B) is a region where grooves are not formed in the edge line portion, and
in the brittle material separation disk-shaped wheel the ratio of a length of a region occupied by the plurality of grooves with respect to an entire perimeter of the edge line portion is equal to or smaller than 3/4, and
performing scribing on a brittle material substrate by applying a force to the scribing wheel to form a scribe line and a vertical crack in the brittle material substrate along the scribe line,
the vertical crack being formed along the vertical direction of the scribe line on the brittle material substrate.

2. A scribing method according to claim 1, wherein in the brittle material separation scribing wheel the ratio of a length of the region (A) occupied by the plurality of grooves with respect to the entire perimeter of the edge line portion is equal to or smaller than 1/4.

3. A scribing method according to claim 1, wherein the length of region (B) is greater than the predetermined pitch.

\* \* \* \* \*